US012651850B2

(12) United States Patent
Feng et al.

(10) Patent No.: US 12,651,850 B2
(45) Date of Patent: Jun. 9, 2026

(54) SWITCHABLE DUAL-BAND DUAL-POLARIZED VICTS ANTENNA SYSTEM FOR SATELLITE COMMUNICATION ON-THE-MOVE

(71) Applicant: Chengdu Guoheng Space Technology Engineering Co., Ltd., Chengdu (CN)

(72) Inventors: Zhiping Feng, Chengdu (CN); Lijun Wang, Chengdu (CN); Jiajun Shen, Chengdu (CN); Zhongchao Luo, Chengdu (CN); Ran Mo, Chengdu (CN)

(73) Assignee: Chengdu Guoheng Space Technology Engineering Co., Ltd., Chengdu (CN)

( * ) Notice: Subject to any disclaimer, the term of this patent is extended or adjusted under 35 U.S.C. 154(b) by 19 days.

(21) Appl. No.: 18/662,715

(22) Filed: May 13, 2024

(65) Prior Publication Data

US 2024/0396231 A1 Nov. 28, 2024

(30) Foreign Application Priority Data

May 26, 2023 (CN) ......................... 202310607232.2

(51) Int. Cl.
*H01Q 21/24* (2006.01)
*H01Q 1/42* (2006.01)
(Continued)

(52) U.S. Cl.
CPC ............... *H01Q 21/24* (2013.01); *H01Q 1/42* (2013.01); *H01Q 3/06* (2013.01); *H01Q 5/30* (2015.01)

(58) Field of Classification Search
None
See application file for complete search history.

(56) References Cited

U.S. PATENT DOCUMENTS

2020/0313303 A1* 10/2020 Milroy ............... H01Q 21/0006
2021/0151901 A1 5/2021 Milroy
2023/0198160 A1* 6/2023 Woolman ............ H01Q 15/242 343/702

FOREIGN PATENT DOCUMENTS

CN 101982899 A 3/2011
CN 110137689 A 8/2019
(Continued)

OTHER PUBLICATIONS

Lu Yan, «Full-text Database of Excellent Master's Theses in China: Information Technology Section» ; May 15, 2023.

*Primary Examiner* — Dameon E Levi
*Assistant Examiner* — Ahn N Ho
(74) *Attorney, Agent, or Firm* — Birchwood IP

(57) ABSTRACT

The present invention relates to the field of antennas and introduces a switchable dual-band dual-polarized VICTS antenna system for satellite communication on-the-move. By adopting a layered structure, the present invention comprises a dual-band VICTS antenna subsystem, a dual-band dual-polarized polarization subsystem, an antenna radome, and a mechanical subsystem. The mechanical subsystem interfaces with the dual-band VICTS antenna subsystem and the dual-band dual-polarized polarization subsystem via motors and belts, enabling seamless integration and control. Further, the antenna system incorporates air gaps within the layer structure, with a supporting structure connecting to the mechanical subsystem through an adapter mechanism. By arranging the switchable dual-band dual-polarized VICTS antenna system in a layered manner, the present invention enhances both gain and bandwidth while enabling precise control over its operation. Furthermore, effective separation of frequency bands is achieved, contributing to reductions in size and cost.

9 Claims, 19 Drawing Sheets

(51) Int. Cl.
*H01Q 3/06* (2006.01)
*H01Q 5/30* (2015.01)

(56) References Cited

FOREIGN PATENT DOCUMENTS

| | | | | | |
|---|---|---|---|---|---|
| CN | 113991296 | A | | 1/2022 | |
| CN | 216214041 | U | * | 4/2022 | |
| CN | 217215065 | U | | 8/2022 | |
| CN | 115051144 | A | * | 9/2022 | ............... H01Q 1/38 |
| CN | 115101926 | A | * | 9/2022 | ............... H01Q 1/50 |
| CN | 115764334 | A | | 3/2023 | |
| CN | 218569207 | U | * | 3/2023 | |
| CN | 219610745 | U | | 8/2023 | |
| WO | 2022217558 | A1 | | 10/2022 | |

* cited by examiner

Phi=0deg

Phi=90deg

Phi=257deg

Phi=351deg

SWITCHABLE DUAL-BAND DUAL-POLARIZED VICTS ANTENNA SYSTEM FOR SATELLITE COMMUNICATION ON-THE-MOVE

CROSS-REFERENCE TO RELATED APPLICATIONS

This application claims priority to Chinese Patent Application No. 202310607232.2, filed on May 26, 2023, which is hereby incorporated by reference in its entirety.

TECHNICAL FIELD

The present invention relates to the field of antennas, and in particular, to a switchable dual-band dual-polarized VICTS antenna system for satellite communication on-the-move.

BACKGROUND

In the realm of modern satellite communication, the demand for continuous real-time communication within a satellite spot beam's coverage area is on the rise, prompting the evolution of satellite mobile communication. The key core technology in the progression is the development of communication antennas capable of tracking satellites in real-time while mounted on moving objects, referred to as "on-the-move" satellite antennas. Presently, two practical on-the-move satellite communication antennas dominate in the market, distinguished by their beam control methods: the active electronically scanned array antenna (AESA antenna), and the mechanically scanned array antenna (MSA antenna).

The conventional MSA antenna, referred to as a rotary disc antenna or reflector antenna, faces limitations due to its bulk profile, substantial volume, and slow steering speed. On the other hand, the AESA antenna is an electronic digital phased array antenna, in which each antenna element has an analog transmitter/receiver module (TRM) that electronically creates a phase shift to steer an antenna beam without physically moving the antenna. This digitally controlled scanning capability of the AESA antenna enables fast scanning of the antenna beam compared to its conventional MSA antenna. Furthermore, in the AESA antenna configuration, since each element has its own TRM, the failure of a single element does not hinder the operation of the system, thereby enhancing the overall reliability of the entire device. However, the AESA antenna's advantages come with trade-offs. Its utilization of a large number of TRMs results in high power consumption and complex feeding mechanisms, ultimately leading to increased costs.

ThinKom Solutions, Inc. pioneered a single-band variable inclination continuous transverse stub (VICTS) array antenna and further developed it into a series of single-band VICTS satellite communication on-the-move antennas. The VICTS antenna employs motors to adjust phases of electromagnetic waves, enabling the alteration of the electromagnetic beam direction through a purely mechanical structure. In comparison to conventional MSA antennas (reflector antennas), the VICTS antenna boasts a low profile and avoids a bulky reflector. Additionally, when compared to AESA antennas, the VICTS antenna omits TRMs, resulting in significantly reduced power consumption. The VICTS antenna offers a series of advantages over both MSA and AESA antennas, summarized as follows:

For a given gain-to-noise temperature ratio (G/T), the aperture area of the VICTS antenna is 2.5 to 8 times smaller than that of the AESA antenna, while maintaining a profile outline comparable to that of the AESA antenna.

The instantaneous bandwidth (IBW) range of the VICTS antenna spans from 500 MHz to 2 GHz, which is 4 to 8 times wider than that of the conventional AESA antenna with narrow IBW. This broad IBW allows the VICTS antenna to cover an entire spectrum simultaneously without the need for re-steering the antenna beam.

The VICTS antenna, despite its mechanical nature, is highly flexible, and it can swiftly switch from tracking one satellite to another in less than 800 milliseconds, ensuring rapid connectivity transitions. Furthermore, its compatibility with modem buffering allows for seamless transitions, facilitating a smooth user experience.

The VICTS antenna consumes significantly less power than the power-intensive AESA antenna while eliminating an additional cooling system. In contrast, many AESA antennas require thermal management to prevent electronics from overheating due to their high power consumption, placing strain on the power supply system.

The VICTS antenna offers the advantage of large-area efficiency and enhanced reliability. Moreover, it outperforms other antennas, particularly at low view angles, and has demonstrated the ability to enable interoperability of geostationary satellites (GSO) and non-geostationary satellites (NGSO).

However, the VICTS antenna is disadvantaged by its large size, insufficient gain and bandwidth, and limitation in addressing zenith angles.

There is an urgent need for a new VICTS antenna system that can effectively address these challenges.

SUMMARY

The present invention introduces a novel switchable dual-band dual-polarized VICTS antenna system for satellite communication on-the-move. This system offers significant improvement over conventional single-band VICTS antenna systems in terms of volume, weight, cost, and flexibility.

The technical solution of the present invention is realized as follows: a switchable dual-band dual-polarized VICTS antenna system for satellite communication on-the-move is provided. The antenna system adopts a layered structure, consisting of a dual-band VICTS antenna subsystem, a dual-band dual-polarized polarization subsystem, and a dual-band/ultra-broadband layered antenna radome. Additionally, a mechanical subsystem is incorporated to control the switchable dual-band dual-polarized VICTS antenna system. The mechanical subsystem is connected to both the dual-band VICTS antenna subsystem and the dual-band dual-polarized polarization subsystem through motorized connections, such as motors and belts. It's important to acknowledge that individuals with expertise may opt for alternative connection methods.

the dual-band VICTS antenna subsystem is structured in layers. One layer comprises a dual-band feed network, which includes a dual-band slow-wave structure and two transitions from rectangular waveguides to the dual-band slow-wave structure. These transitions connect rectangular waveguides as input/output to the dual-band slow-wave structure, providing it with a line source. The dual-band slow-wave structure is a two-dimensional groove grid structure created by orthogonally interweaving single-band slow-wave structures in two different bands. The other layer consists of a dual-band VICTS electromagnetic radiator, created by integrating two single-band VICTS radiators in an orthogonal manner, resulting in a two-dimensional matrix structure of metal blocks;

the dual-band dual-polarized polarization subsystem includes either two linear polarizers, two circular polarizers, or one linear polarizer and one circular polarizer. When two frequency bands are sufficiently close, such as two sub-bands in one frequency band, the subsystem can be simplified to include one linear polarizer or one circular polarizer. In frequency bands with linearly polarized waves, linear polarizers are utilized to rotate the E-vectors of electromagnetic beams. Conversely, in frequency bands with circularly polarized waves, circular polarizers are employed to convert linearly polarized waves into either left-handed or right-handed circularly polarized waves;

the antenna system further features air gaps between layer structures;

the mechanical subsystem comprises motors, and is connected to the dual-band VICTS antenna subsystem and the dual-band dual-polarized polarization subsystem through motors and belts, and it's important to acknowledge that individuals with expertise may opt for alternative connection methods.

the layer structure further includes a second supporting structure connected to the mechanical subsystem through a second adapter mechanism.

Further, the transition from the rectangular waveguide to the dual-band slow-wave structure comprises a rectangular waveguide as input/output, a twisted waveguide, a power divider, and multiple adapters connected to a parallel plate waveguide; and the power divider in the transition is positioned in an H-plane or E-plane of the rectangular waveguide.

Further, the dual-band slow-wave feed network comprises two single-band slow-wave structures. The grooves of these two single-band slow-wave structures are orthogonally disposed.

Further, the mechanical subsystem includes motors, belts, and the second supporting structure. Each motor independently controls a layer of the system, excluding the radome layer (L6), via a belt. These motors are interconnected with the dual-band VICTS antenna subsystem, the dual-band dual-polarized polarization subsystem, and the antenna radome through the second adapter mechanism.

Further, the antenna radome adopts a dual-band or ultra-broadband sandwich structure.

Further, both the dual-band VICTS antenna subsystem and the dual-band dual-polarized polarization subsystem are formed by layered dielectric material, and metal blocks, which can be manufactured from plated plastic material.

The antenna system further includes a dual-band rotary joint having two input/output ports.

The layered structure consists of six independent layers, arranged sequentially from the bottom as follows: L1, L2, L3, L4, L5, and L6. Layer 1 (L1) comprises a dual-band slow-wave structure and two transitions from rectangular waveguides to the dual-band slow-wave structure; layer 2 (L2) is a dual-band VICTS electromagnetic radiator; layer 3 (L3) and layer 4 (L4) are two separate plate layers serving as linear polarizers; layer 5 (L5) functions as a circular polarizer; layer 6 (L6) is a dual-band/ultra-broadband antenna radome featuring a layered sandwich structure. The dual-band/ultra-broadband layered antenna radome is securely mounted on a housing. Layers L1, L2, L3, L4, and L5 are each connected to independent motors.

The air gaps refer to spaces between the six layers, arranged sequentially from the bottom as follows: G0, G1, G2, G3, and G4. G0 represents the interlayered air gap between the dual-band slow-wave structure and the dual-band VICTS electromagnetic radiator in the dual-band VICTS antenna subsystem; G1 signifies the interlayered air gap between the dual-band VICTS antenna subsystem and the dual-band dual-polarized polarization subsystem; G2 denotes the interlayered air gap between two plate layers of the linear polarizer in the dual-band dual-polarized polarization subsystem; G3 indicates the interlayered air gap between the linear polarizer and the circular polarizer in the dual-band dual-polarized polarization subsystem; finally, G4 represents the interlayered air gap between the dual-band dual-polarized polarization subsystem and the dual-band/ultra-broadband antenna radome.

At the base of the switchable dual-band dual-polarized VICTS antenna system, a separated motorized rotation stage, referred to as the motor platform system, has been designed and integrated to improve the scanning range. The motorized rotation stage comprises two motors, two speed reducers, three bevel gears, and a first supporting structure, all mechanically interconnected. It is connected to the switchable dual-band dual-polarized VICTS antenna system via the first adapter mechanism.

The present invention discloses a switchable dual-band dual-polarized VICTS antenna system for satellite communication on-the-move. Arranging the antenna system in a layered manner enhances gain and bandwidth while effectively segregating frequency bands. This approach concurrently reduces size and cost, and enhances complete manufacturing control capability. In addition, a separate motor platform system is positioned beneath the antenna system, enabling beam scanning across the zenith for both frequency bands.

BRIEF DESCRIPTION OF DRAWINGS

To describe the technical solutions in embodiments of the present invention or in the conventional technology more clearly, the following section briefly describes the accompanying drawings used to illustrate these embodiments or the conventional technology. It is important to note that the accompanying drawings presented in the following description show merely some embodiments of the present invention, and individuals with ordinary skill in the art may derive other drawings from these accompanying drawings without the need for creative efforts.

FIG. 3A is a three-dimensional view of a twisted waveguide, FIG. 3B is a three-dimensional view of a twisted waveguide and a power divider connected to it, FIG. 3C is a three-dimensional view of a twisted waveguide, a power divider, and a plurality of adapters connected to a parallel plate waveguide, and FIG. 3D provides a three-dimensional view of the entire transition incorporating a slow-wave structure;

FIG. 19A presents a side view of the motorized rotation stage in a horizontal position, while FIG. 19B displays a side view of the other side of the motorized rotation stage when the antenna system is rotated 10 degrees;

REFERENCE NUMERALS

100: dual-band VICTS antenna subsystem; 200: dual-band dual-polarized polarization subsystem; 300: dual-band/ultra-broadband layered antenna radome; 400: mechanical subsystem; 500: air gap; 101: dual-band feed network; 102: dual-band VICTS electromagnetic radiator; 1021: single-band VICTS radiator; 201: linear polarizer; 202: circular polarizer; 401: first adapter mechanism; 1: motor; 2: belt; 3: rectangular waveguide; 31: H-plane; 32: E-plane; 4: twisted waveguide; 5: power divider; 6: transition; 7: dual-band slow-wave structure; 71: single-band slow-wave structure; 8: gap; 9: stub; 10: stacking block; 11: first supporting structure; 12: antenna system; 13: parallel plate waveguide; 14: adapter; 15: dual-band rotary joint; 16: motorized rotation stage; 161: speed reducer; 162: bevel gear; L1, L2, L3, L4, L5, and L6: layered structures; and G0, G1, G2, G3 and G4: interlayered air gaps; 17: input/output port; 18: housing; 19: second supporting structure; 20: second adapter mechanism.

DESCRIPTION OF EMBODIMENTS

The following clearly and completely describes the technical solutions in embodiments of the present invention concerning the accompanying drawings in embodiments of the present invention. The described embodiments are merely a part rather than all of the embodiments of the present invention. Based on the embodiments of the present invention, all other embodiments obtained by those of ordinary skill in the art without creative effort fall within the protection scope of the present invention.

Figure 1:
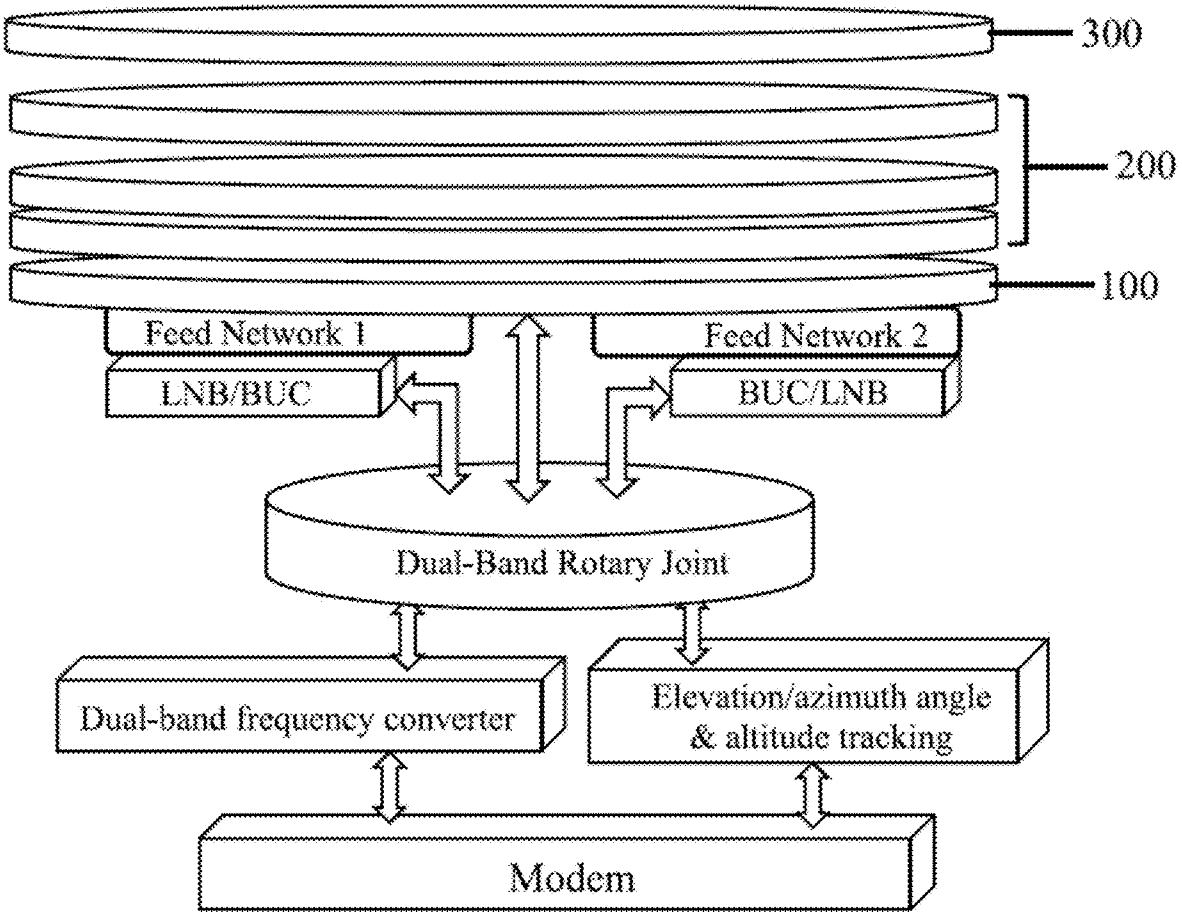
FIG. 1 is a block diagram of the system according to the present invention with an external tracking network.

The present invention discloses a switchable dual-band dual-polarized VICTS antenna system for satellite communication on-the-move. A block diagram of the switchable dual-band dual-polarized VICTS antenna system, along with an external tracking network, is shown in FIG. 1. Wherein the antenna system adopts a layered structure, consisting of a dual-band VICTS antenna subsystem 100, a dual-band dual-polarized polarization subsystem 200, and a dual-band/ultra-broadband antenna radome 300. Additionally, a mechanical subsystem 400, responsible for controlling and supporting the switchable dual-band dual-polarized VICTS antenna system, complements the setup. Although not shown in FIG. 1, the mechanical subsystem plays a crucial role in ensuring the functionality and stability of the antenna system.

The dual-band VICTS antenna subsystem 100 is structured in layers. One layer is the dual-band feed network 101, which comprises a dual-band slow-wave structure 7 and two transitions 6 from rectangular waveguides 3 to the dual-band slow-wave structure 7. The transition 6 serves to connect the rectangular waveguide 3 as input/output to the dual-band slow-wave structure 7, providing it with a line source. The dual-band slow-wave structure 7 adopts a two-dimensional groove grid structure, formed by orthogonally interweaving single-band slow-wave structures 71 of two bands. The other layer is a dual-band VICTS electromagnetic radiator 102, created by orthogonally integrating two single-band VICTS antenna radiators 1021. Specifically, the long sides of slots 8 of the two single-band VICTS electromagnetic radiators are interwoven perpendicularly, forming a two-dimensional matrix structure of metal blocks. When the radiation slots of two single-band VICTS antennas are integrated with their long sides perpendicular to each other, the resulting electromagnetic waves can radiate independently with two orthogonal linear polarizations.

The dual-band dual-polarized polarization subsystem 200 is configured with either two linear polarizers 201, two circular polarizers 202, or a combination of one linear polarizer 201 and one circular polarizer 202. In cases where the two bands are sufficiently close, the subsystem may employ a single broadband linear polarizer 201 or a single broadband circular polarizer 202. When a linear polarizer is employed, it rotates the E-vector of an electromagnetic beam; conversely, when a circular polarizer is used, it converts linear polarization into left-handed or right-handed circularly polarized waves;

the antenna system further comprises air gaps 500 between layer structures;

the mechanical subsystem 400 comprises motors 1 and belts 2, which are interconnected with the dual-band VICTS antenna subsystem and the dual-band dual-polarized polarization subsystem through motors 1 and belts 2; it's important to acknowledge that individuals with expertise may opt for alternative connection methods; and the multi-layer structures mentioned above further comprise a second supporting structure 19, connected to the mechanical subsystem via a second adapter mechanism 20.

Further, the transition 6 from the rectangular waveguide 3 to the dual-band slow-wave structure 7 comprises a rectangular waveguide 3 as input/output, a twisted waveguide 4, a power divider 5, and a plurality of adapters 14 connected to a parallel plate waveguide 13. The power divider 5 in transition 6 is disposed in an H-plane 31 or E-plane 32 of the rectangular waveguide 3.

Further, the dual-band slow-wave feed network comprises two single-band slow-wave structures 71, with the grooves of the two single-band slow-wave structures 71 orthogonally disposed. This arrangement allows two electromagnetic waves with two orthogonal linear polarizations to propagate independently in two perpendicular directions within the dual-band slow-wave structure. The dual-band slow-wave feed network is placed below the dual-band VICTS electromagnetic radiator, providing electromagnetic waves of two frequency bands to feed the dual-band VICTS electromagnetic radiator. Further, the air gap 500 between the dual-band VICTS electromagnetic radiator and the dual-band slow-wave feed network has been optimized to suppress side lobes while implementing higher gain and wider bandwidth.

Further, the mechanical subsystem 400 comprises motors 1, belts 2, and a second supporting structure 19. Each motor 1 controls a layer of the switchable dual-band dual-polarized VICTS antenna system, excluding the antenna radome, through a belt 2. The motors are connected to the dual-band VICTS antenna subsystem, the dual-band dual-polarized polarization subsystem, and the antenna radome via the second adapter mechanism 20.

Further, the antenna radome features a dual-band or broadband sandwich structure.

Further, the dual-band VICTS electromagnetic radiator 102 in the dual-band VICTS antenna subsystem is constructed using layered dielectric materials and metal blocks made from plated plastic materials.

The antenna system further comprises a dual-band rotary joint 15 having two input/output ports 17 to support various combinations of transmit (TX) and receive (RX) operations, including TX/TX, RX/RX, and TX/RX configurations.

In one embodiment, operating at the Ka and Ku bands, the layered structure consists of six independent layers arranged from bottom to top as follows: Layer 1 (L1) comprises a dual-band slow-wave structure 7 and two transitions 6 from rectangular waveguides 3 to the dual-band slow-wave structure 7; Layer 2 (L2) is a dual-band VICTS electromagnetic radiator 102; Layer 3 (L3) and Layer 4 (L4) are two separate plates of a linear polarizer 201; Layer 5 (L5) is a circular polarizer; and Layer 6 (L6) is a dual-band/ultra-broadband layered antenna radome, securely mounted on a housing 18. The mechanical subsystem 400 comprises five motors 1 and corresponding belts, mechanically connected to a second supporting structure 19. Each of the five motors 1 is connected to one of the layers (L1, L2, L3, L4, and L5) within the layered structure mentioned above via a belt 2.

The air gaps 500 are spaces between the six layers, arranged sequentially from the bottom as follows: G0, G1, G2, G3, and G4; G0 represents the interlayered air gap between the dual-band slow-wave structure 7 and the dual-band VICTS electromagnetic radiator 102 in the dual-band VICTS antenna subsystem; G1 is situated between the dual-band VICTS antenna subsystem and the dual-band dual-polarized polarization subsystem; G2 exists between two plate layers of the linear polarizer 201 in the dual-band dual-polarized polarization subsystem; G3 is present between the linear polarizer 201 and the circular polarizer 202 in the dual-band dual-polarized polarization subsystem; and G4 separates the dual-band dual-polarized polarization subsystem from the dual-band antenna radome.

At the bottom of the switchable dual-band dual-polarized VICTS antenna system, there is also a motorized rotation stage 16. This stage comprises two motors 1, two speed reducers 161, three bevel gears 162, and a mechanically connected first supporting structure 11. It is linked to the switchable dual-band dual-polarized VICTS antenna system through the first adapter mechanism 401.

A dual-band dual-polarized polarization subsystem within a switchable dual-band dual-polarized VICTS antenna system has been designed for Ka and Ka bands, serving as a design example. The present invention comprises several subsystems: 1) A dual-band VICTS antenna subsystem comprising a dual-band VICTS electromagnetic radiator, a dual-band slow-wave structure 7, and two transitions 6 from rectangular waveguides 3 to the dual-band slow-wave structure 7; 2) A dual-band dual-polarized polarization subsystem supporting various combinations of linear and circular polarization; 3) A dual-band rotary joint 15 capable of connecting the switchable dual-band dual-polarized VICTS antenna system to input and output ports 17, supporting various combinations of transmit (Tx) and receive (Rx), such as Tx/Tx, or Rx/Rx or Tx/Rx; 4) An ultra-wideband/dual-band multi-layer antenna radome; 5) An overall mechanical subsystem configured to support the switchable dual-band dual-polarized VICTS antenna system and control its performance.

Figure 2:
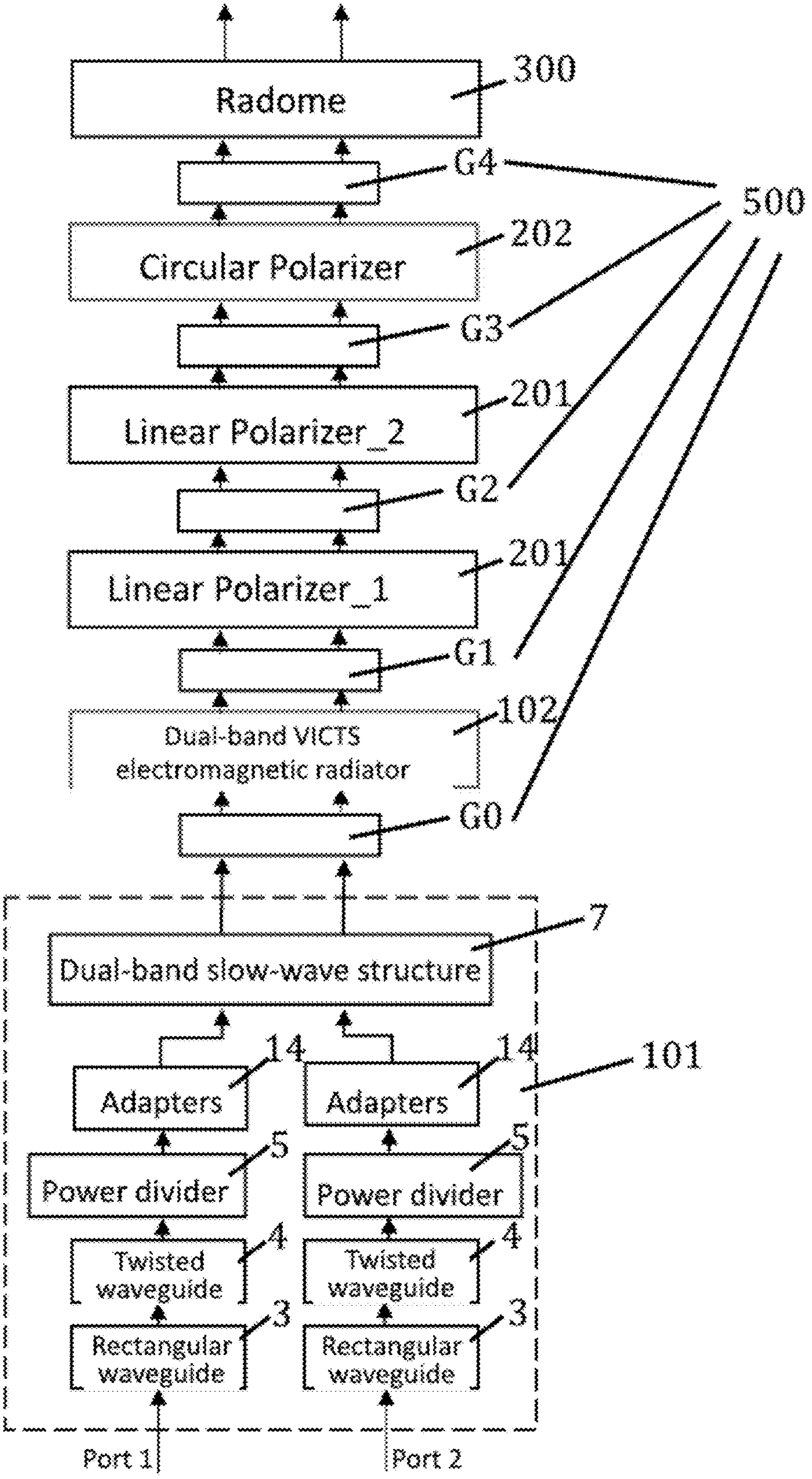
FIG. 2 is a block diagram of the present invention.
Figure 4:
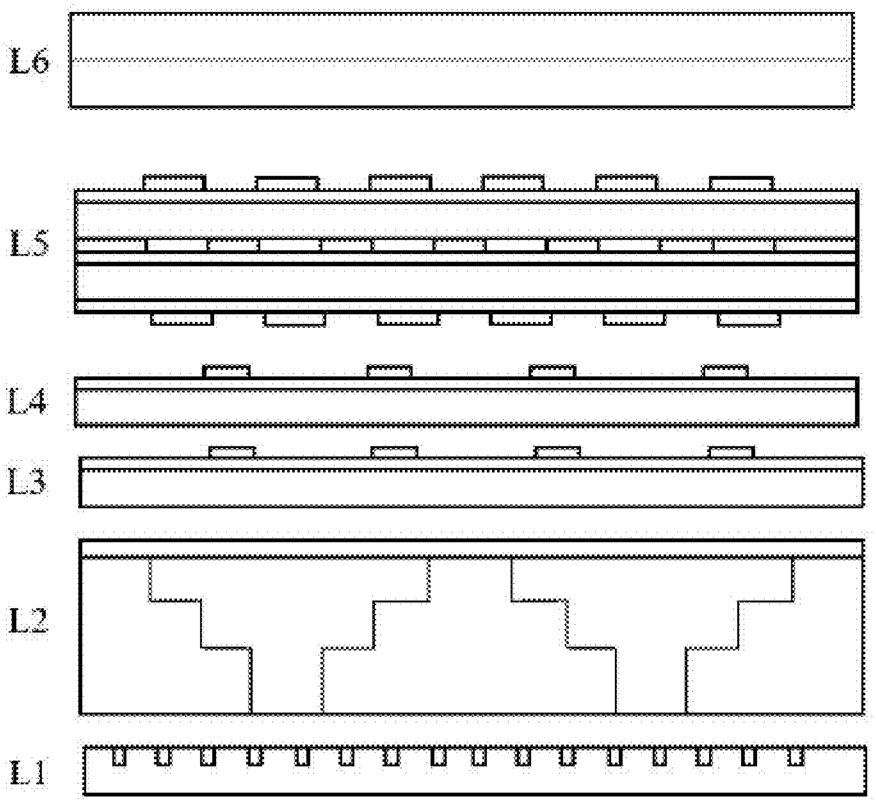
FIG. 4 is a schematic side view of the present invention.
Figure 17:
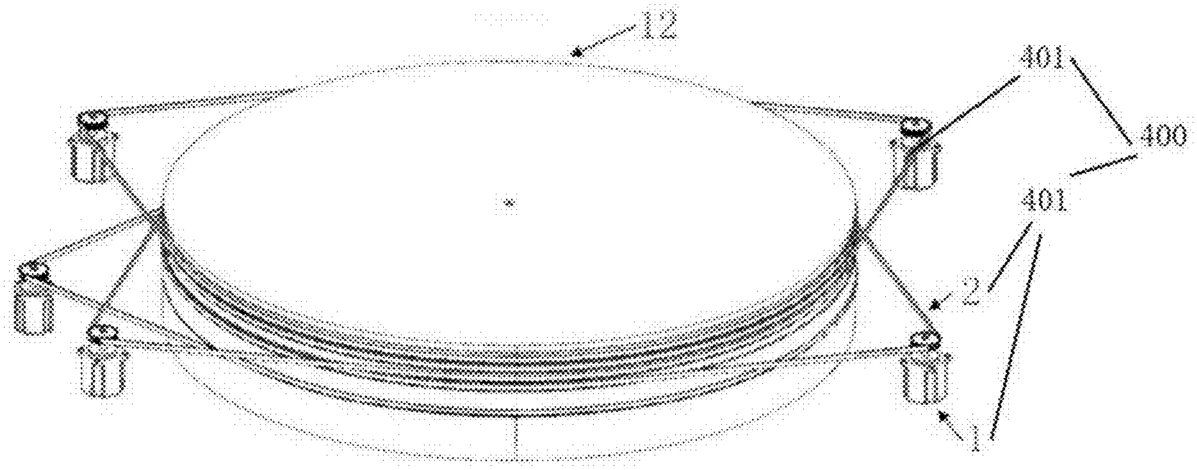
FIG. 17 is a design embodiment of rotary motors and belts in a mechanical subsystem according to the present invention.

The switchable dual-band dual-polarized VICTS antenna system has been developed as a multi-layer structure, designed for manufacturing and assembly (DFMA). As a specific design instance, a switchable dual-band dual-polarized VICTS antenna system has been designed to operate in both Ku and Ka bands. In this configuration, Rx operates in Ku band with a linearly polarized beam, while Tx operates in Ka band with a circularly polarized beam. Organized into a six-layer structure, each layer of the design example antenna system is relatively independent and can be manufactured and assembled separately, which enhances flexibility and efficiency in the production process. FIG. 2 shows a block diagram of the design example antenna system, starting from the bottom, layer 1 (L1) represents a dual-band feed network 101 comprising a dual-band slow-wave structure 7 and two transitions 6 from rectangular waveguides 3 to the dual-band slow-wave structure 7. Layer 2 (L2) represents a dual-band VICTS electromagnetic radiator 102; Layer 3 (L3) and Layer 4 (L4) form a linear polarizer 201 with two separate plate layers; Layer 5 (L5) represents a circular polarizer 202, and Layer 6 (L6) serves as the final dual-band/ultra-broadband layered antenna radome. Further, interlayered air gaps between these layers, denoted as G0, G1, G2, G3, and G4, are optimized in the respective system or between these layers or subsystems. For instance, in FIG. 2, G0 is the interlayered air gap between the dual-band slow-wave structure 7 and the dual-band VICTS electromagnetic radiator 102 in the dual-band VICTS antenna subsystem. It serves as one of the design parameters in the simulation optimization process for the dual-band VICTS antenna subsystem, while ensuring the feasibility of rotating L1 and L2; G1 is an interlayered air gap between the dual-band VICTS antenna subsystem and the dual-band dual-polarized polarization subsystem. It undergoes simulation optimization after the two subsystems have been designed to achieve optimal performance while ensuring the feasibility of rotating L2 and L3;

G2 is an interlayered air gap between two polarization plates of a linear polarizer 201 in a dual-band dual-polarized polarization subsystem. This air gap serves as one of the design parameters of the linear polarizer. Optimization of the air gap considers not only the design specifications of the linear polarizer but also ensures the feasibility of rotating L3 and L4; G3 is an interlayered air gap between a linear polarizer 201 and a circular polarizer 202 within the dual-band dual-polarized polarization subsystem. It undergoes simulation optimization after the design optimization of both the linear polarizer 201 and the circular polarizer 202 to achieve optimal performance while ensuring the feasibility of rotating L4 and L5; G4 is an interlayered air gap between the dual-band dual-polarized polarization subsystem and the dual-band/ultra-broadband layered antenna radome. The primary considerations for this air gap design are the feasibility of rotating L1, L2, L3, L4, and L5, as well as the reliability of machine production and assembly. Once the design optimization of each subsystem of the entire antenna system 12 is completed, the G4 parameter can be determined through the simulation of the entire antenna system 12. Skilled professionals can apply this design principle to optimize the air gap between the layers for other bands. FIG. 4 shows a side view of a multi-layer structure of this embodiment, where L1, L2, L3, L4, and L5 are designed as independent plate layers. Additionally, the L6 dual-band/ultra-broadband layered antenna radome is securely fixed on the housing 18 of the antenna system 12 without rotation. To achieve the required performance by controlling the 360-degree rotation of L1, L2, L3, L4, and L5, a mechanical subsystem 400, consisting of independent five motors 1, is introduced as a design example, as shown in FIG. 17.

Transition 6 from a rectangular waveguide 3 to a dual-band slow-wave structure 7.

Figure 3A:
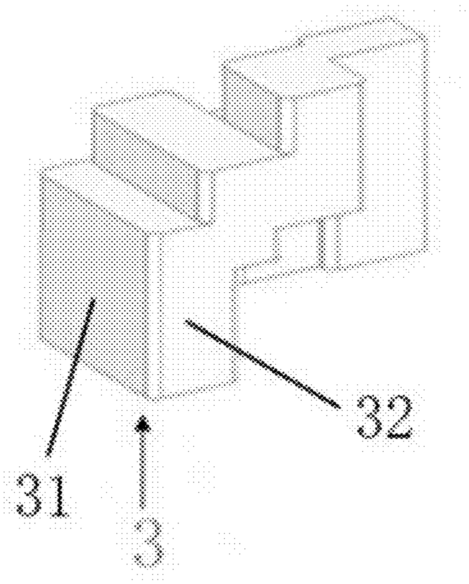
FIGS. 3A, 3B, 3C and 3D showcase the transition from a rectangular waveguide to a dual-band slow-wave structure.
Figure 3B:
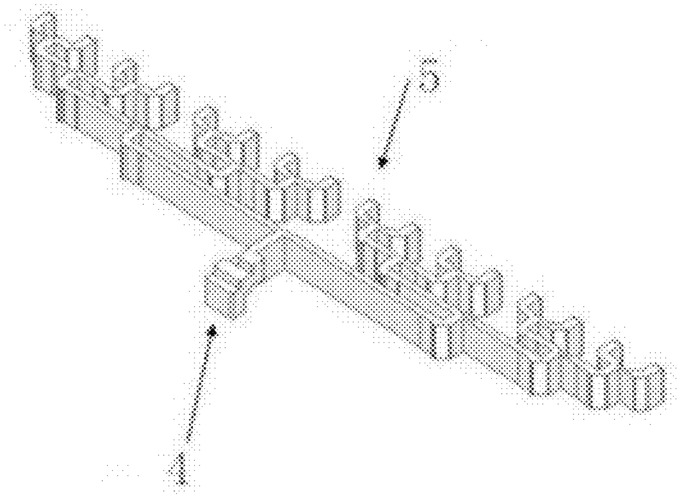

The transition 6 from the rectangular waveguide 3 to the slow-wave structure has been innovatively designed to provide line sources for the dual-band slow-wave structure 7 as a feed network in a dual-band VICTS antenna subsystem. The transition 6 comprises a rectangular waveguide 3 as input/output, a twisted waveguide 4, a power divider 5, and a plurality of adapters 14 connecting the power divider 5 to a parallel plate waveguide 13, as shown in FIG. 2. The step-wise design of this transition 6 is shown in FIGS. 3A-3D, where, FIG. 3A shows a three-dimensional view of a twisted waveguide 4 with the rectangular waveguide 3, while FIG. 3B shows the twisted waveguide 4 and power divider 5 interconnected.

Figure 3C:
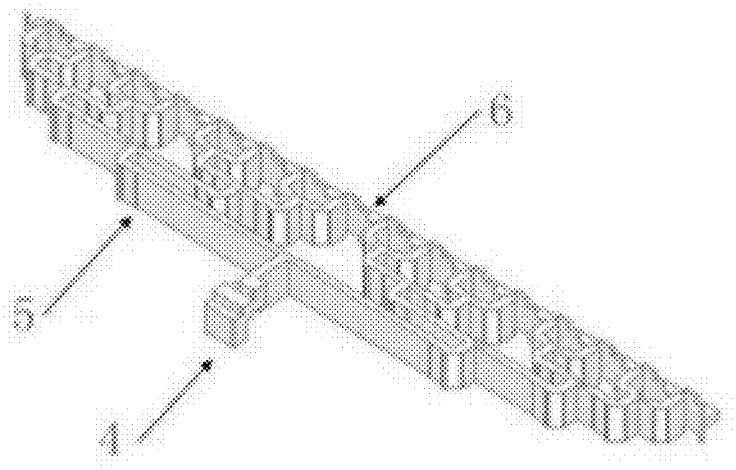
Figure 3D:
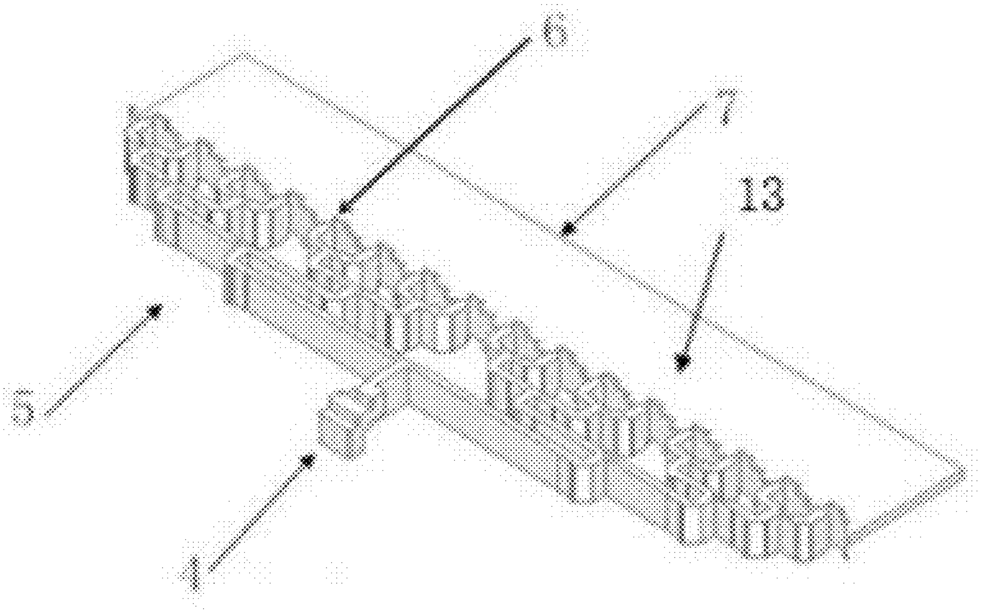

In this embodiment, the number of power dividers can vary from one to sixteen according to the size of the antenna system 12. In addition, the power divider 5 in this embodiment is initially configured in an H plane 31 but can be alternatively designed in an E plane 32 based as needed. To enhance bandwidth and gain while suppressing side lobes, the design optimization of power divider 5 has been conducted using a function matching method. FIG. 3C shows a transition 6, with sixteen adapters 14 connected to a power divider 5 and a twisted waveguide 4, facilitating the transition 6 from a rectangular waveguide 3 to a parallel plate waveguide 13. FIG. 3D shows the complete transition design, including a portion of the dual-band slow-wave structure 7. The bandwidth of the transition 6 from the rectangular waveguide 3 to the dual-band slow-wave structure 7 is limited by the bandwidth of the rectangular waveguide 3.

Figure 5:
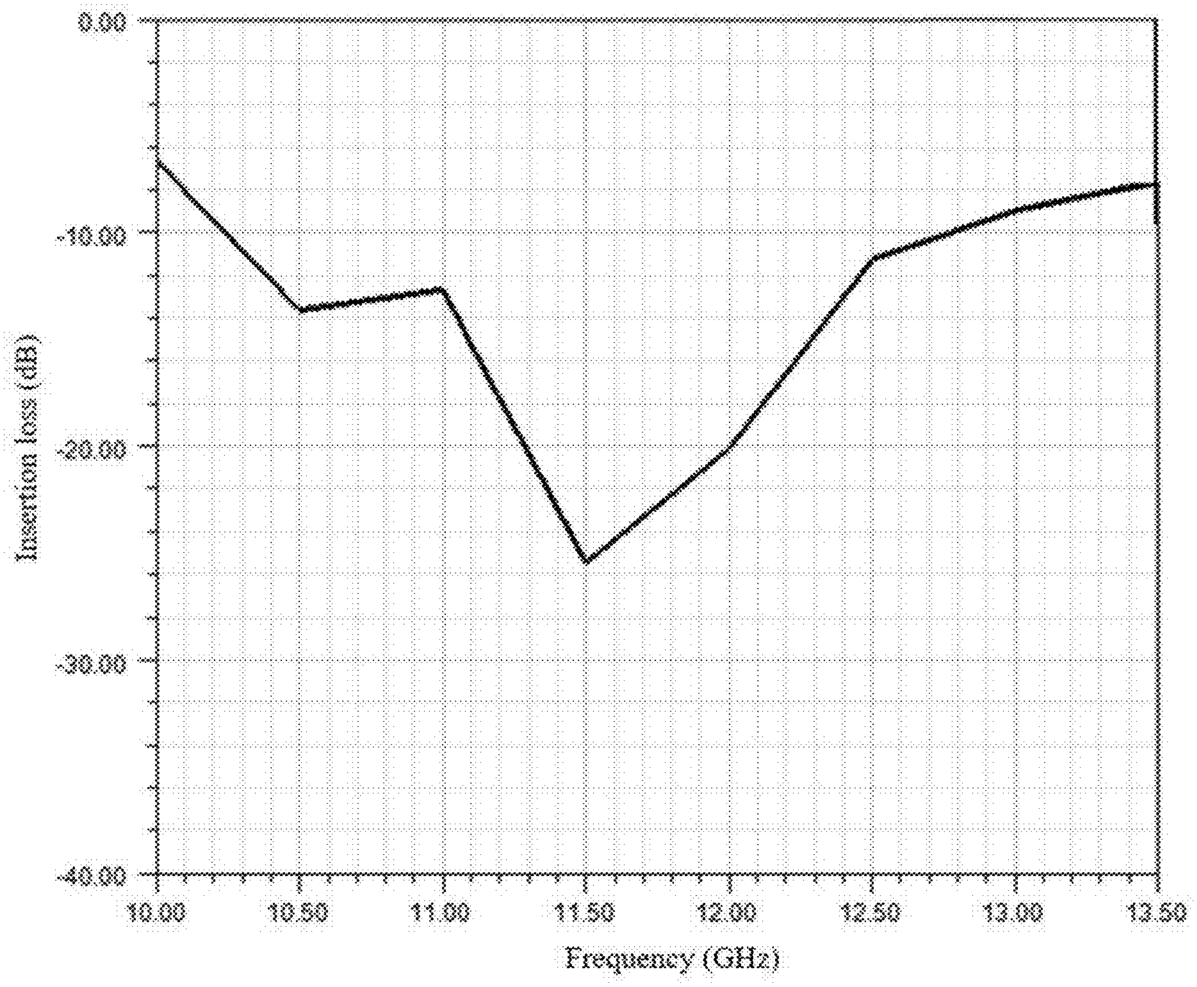
FIG. 5 shows the simulation return loss of a transition from a rectangular waveguide to a dual-band slow-wave structure at Ku band.
Figure 6:
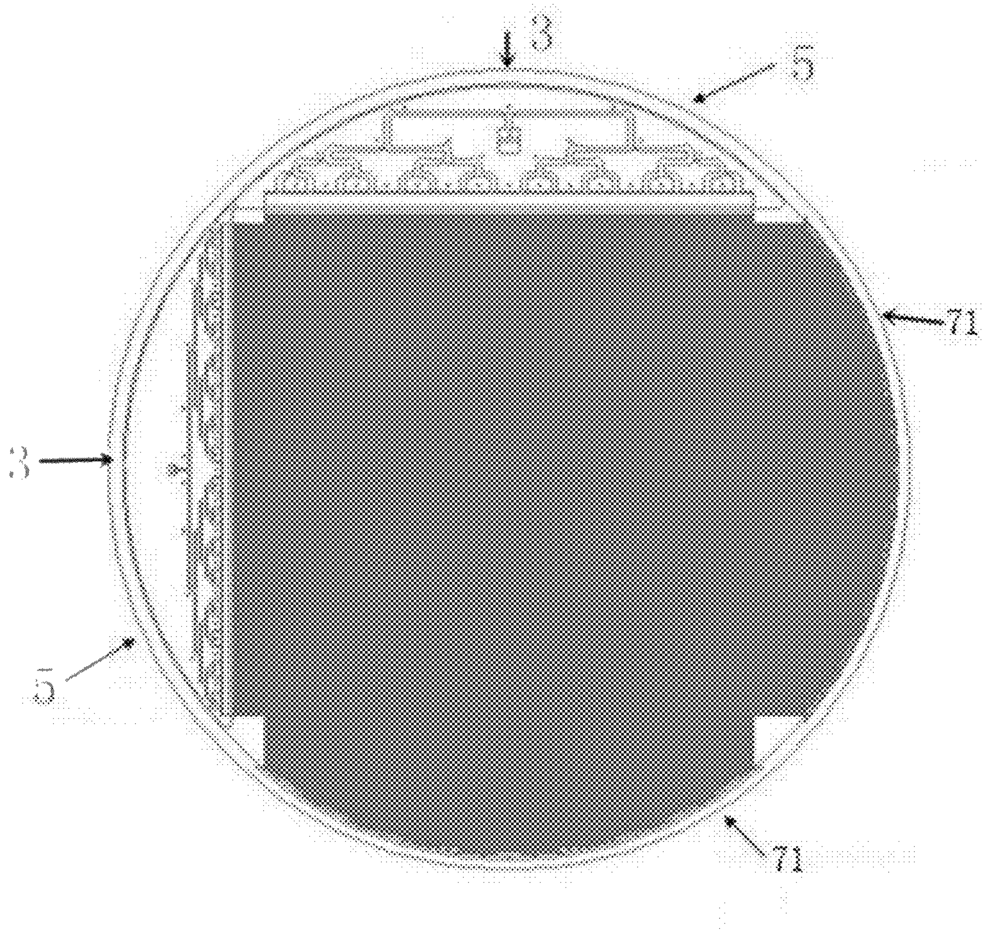
FIG. 6 is a top view of layer L1 according to the present invention.

In this embodiment, to overcome this limitation of the bandwidth of the rectangular waveguide 3 itself, separate transitions 6 from the separate rectangular waveguide 3 to the dual-band slow-wave structure 7 have been designed independently for Ku and Ka bands, as shown in FIG. 6. The simulation results of the Ku band transition structure are shown in FIG. 5, additionally, the Ku band transition structure exhibits similar simulation results.

Dual-Band Slow-Wave Structure 7.

A dual-band slow-wave structure 7 has been designed to serve as the feeding network for a dual-band VICTS electromagnetic radiator 102. This innovative design not only enhances the bandwidth and gain of the dual-band VICTS antenna subsystem but also effectively suppresses side lobes. Traditionally utilized in single-band waveguides, a slow-wave structure can be engineered by introducing grooves onto the inner wall of the waveguide to adjust the phase of the electromagnetic wave propagating inside. The technique is commonly employed in parallel plate waveguides 13. To provide a feed network for the dual-band VICTS electromagnetic radiator 102, a dual-band slow-wave structure 7 has been creatively developed by integrating two single-band slow-wave structures 71 in an orthogonal fashion. The long sides of grooves within the two single-band slow-wave structures 71 are positioned perpendicular to each other and interwoven on the inner wall of the waveguide, resulting in the formation of a two-dimensional groove grid structure. This configuration enables two independent electromagnetic waves to propagate along the dual-band slow-wave structure 7 in two orthogonal directions. Situated beneath the dual-band VICTS electromagnetic radiator, the dual-band slow-wave feed network provides two independent electromagnetic waves of two frequency bands, each feeding into the dual-band VICTS electromagnetic radiator, as depicted in FIG. 4. G0, an air gap between the dual-band VICTS electromagnetic radiator and the dual-band slow-wave feed network, as shown in FIG. 2, has been optimized through simulation to achieve higher gain and wider bandwidth.

The dual-band slow-wave structure 7, along with the transition 6 from the rectangular waveguide 3 to the dual-band slow-wave structure 7, constitutes the bottom layer L1 of the entire switchable dual-band dual-polarized VICTS antenna system. The layout of L1 for the Ka and Ku frequency band embodiment is presented in FIG. 6.

Dual-Band VICTS Electromagnetic Radiator 102.

Figure 7:
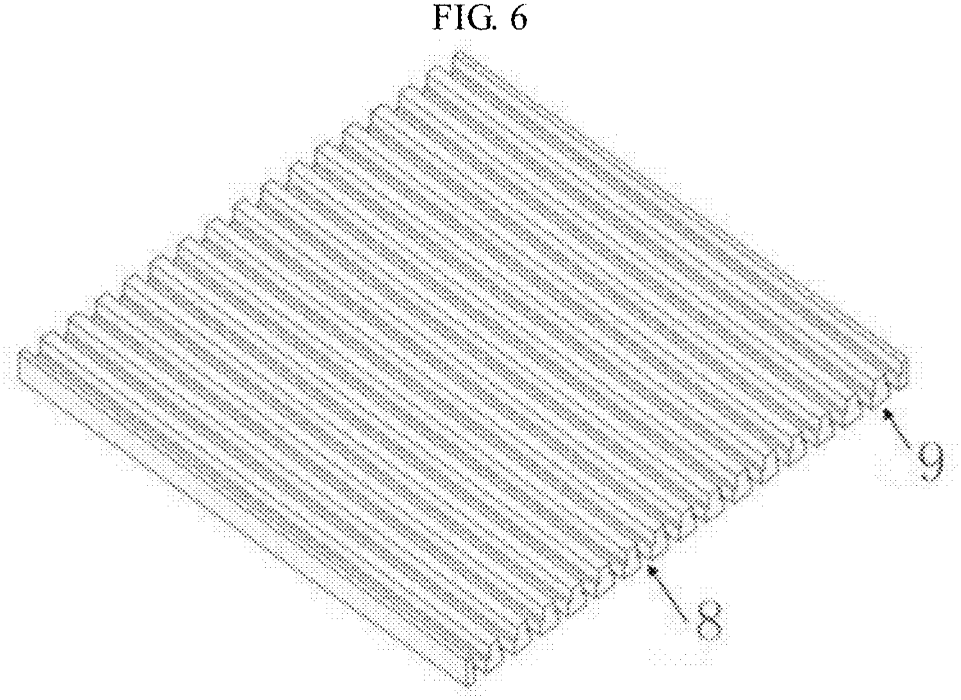
FIG. 7 is a stub array for a single-band VICTS radiator.

A dual-band VICTS electromagnetic radiator 102 is an innovative integration of two single-band VICTS antennas. For comparison, a single-band VICTS array is shown in FIG. 7. In the single-band VICTS antenna, the E-vector of the electromagnetic wave from the radiation slot 8 is perpendicular to the long side of the slot 8. By orthogonally integrating the radiation slots 8 of the two single-band VICTS antennas and ensuring that the long sides of the stubs 9 in the two single-band VICTS antennas are perpendicular to each other, the two single-band VICTS antennas can be superimposed and combined in one plane to form a two-dimensional array of stacking blocks 10, constituting the dual-band VICTS electromagnetic radiator. In the dual-band VICTS electromagnetic radiator, the electromagnetic waves of two frequency bands can propagate and radiate independently without interference. As an example, a dual-band VICTS electromagnetic radiator has been developed and designed for Ka and Ku bands, with a top view layout shown in FIG. 8.

The developed dual-band VICTS electromagnetic radiator 102 enables the transmission/reception of beams in two bands to utilize the same apertures. It retains all the advantages of a single-band VICTS antenna while significantly reducing the size of the Tx and Rx antenna system 12.

Assembly and Optimization of Dual-Band VICTS Antenna Subsystem.

Figure 8:
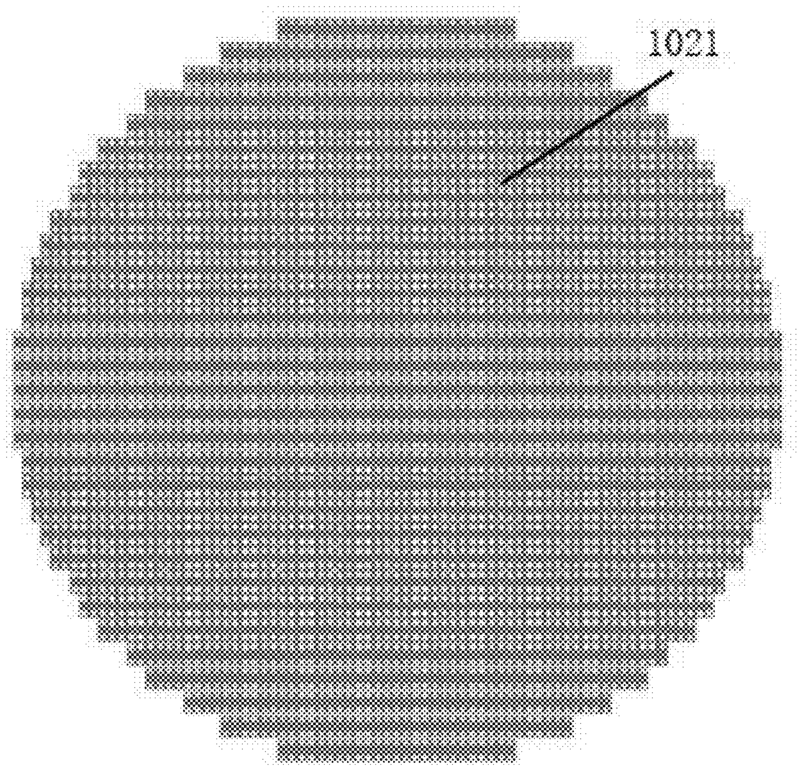
FIG. 8 provides a top view of a dual-band VICTS electromagnetic radiator in a switchable dual-band dual-polarized VICTS antenna system.
Figure 9A:
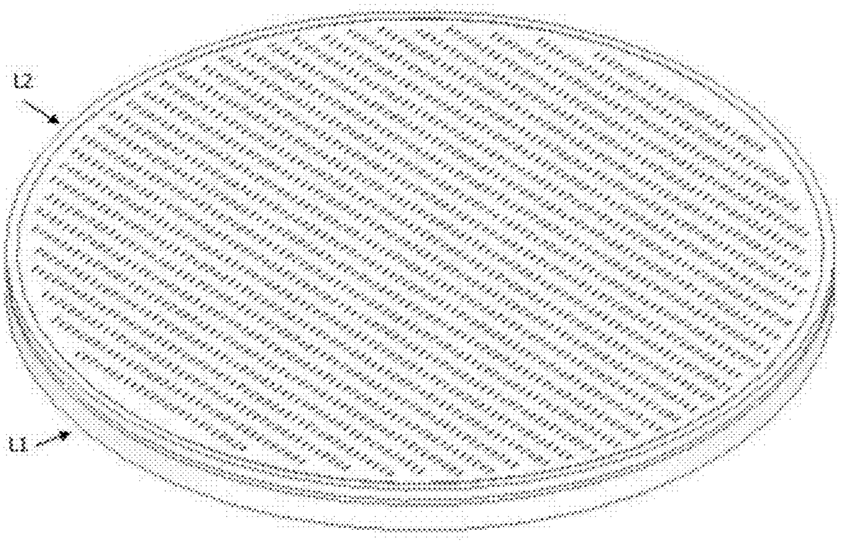
FIGS. 9A and 9B show the embodiment of a dual-band VICTS antenna subsystem in Ka and Ku frequency bands, offering both a three-dimensional view (FIG. 9A) and a side view (FIG. 9B)
Figure 9B:
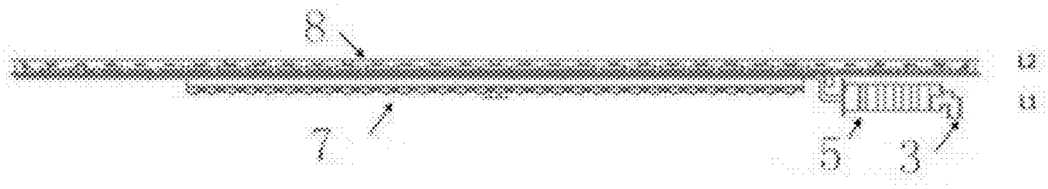

The dual-band VICTS antenna subsystem 102 is comprised of several key components, including a transition 6 from a rectangular waveguide 3 to a dual-band slow-wave structure 7, a dual-band slow-wave structure 7 itself, and a dual-band VICTS electromagnetic radiator 102. Employing a layered structure design, this subsystem is well suited for independent motorized control of rotation. Notably, the dual-band slow-wave structure 7 and the transition 6 from the rectangular waveguide 3 to the dual-band slow-wave structure 7 have been designed and integrated into a single layer as the bottom layer L1, as shown in FIGS. 6, 9A and 9B. Conversely, the dual-band VICTS electromagnetic radiator has been designed as a separate layer as the top layer L2, as shown in FIGS. 8, 9A and 9B, These layers are then assembled in a centered alignment to form the dual-band VICTS antenna subsystem, as shown in FIGS. 4, 9A and 9B. Furthermore, to enhance the performance of the dual-band VICTS antenna subsystem, the interlayered air gap G0 between the top layer L1 and the bottom layer L2 of the dual-band VICTS antenna subsystem has been optimized through simulation, as referenced in FIG. 2. Additionally, both individual components and the subsystems as a whole have undergone optimization processes aimed at minimizing signal leakage and enhancing in-band flatness, isolation, impedance matching, bandwidth, gain, and efficiency of the antenna subsystem.

One of the significant advantages of a single-band VICTS antenna is mechanical beam steering, a feature fully retained by the dual-band VICTS antenna subsystem. In the single-band VICTS antenna, the initial position is set when the long side of slot 8 of the single-band VICTS radiator aligns parallel to the long side of the groove of the feed network of the single-band slow-wave structure 71. In this configuration, linearly polarized electromagnetic waves emitted by the single-band VICTS antenna propagate outward along the Z direction, perpendicular to the plane of the VICTS radiator. When a feed network of a slow-wave structure 7 rotates around the Z direction with the center of a VICTS radiator plate as the pivot, the relative included angle between slot 8 of the VICTS radiator and the groove of the feed network of the slow-wave structure 7 changes, referred to as the rotation angle. Increasing the rotation angle from the initial 0 degrees steers the beam radiation direction of the electromagnetic waves away from the Z direction, enabling beam control. The included angle between the beam and the Z direction is known as the zenith angle, which increases proportionally with the rotation angle. Similarly, in the dual-band VICTS antenna subsystem, when the top layer L2 remains stationary and the bottom layer L1 rotates around the Z direction at the center of the antenna plane, the radiation direction of the electromagnetic waves emitted by the antenna deviates from the Z direction, facilitating beam control. The two rectangular waveguides 3 in the dual-band VICTS antenna subsystem correspond to two bands. The dual-band VICTS antenna subsystem allows seamless switching between bands for transmission or reception, enabling independent operation of the two bands.

Figure 10A:
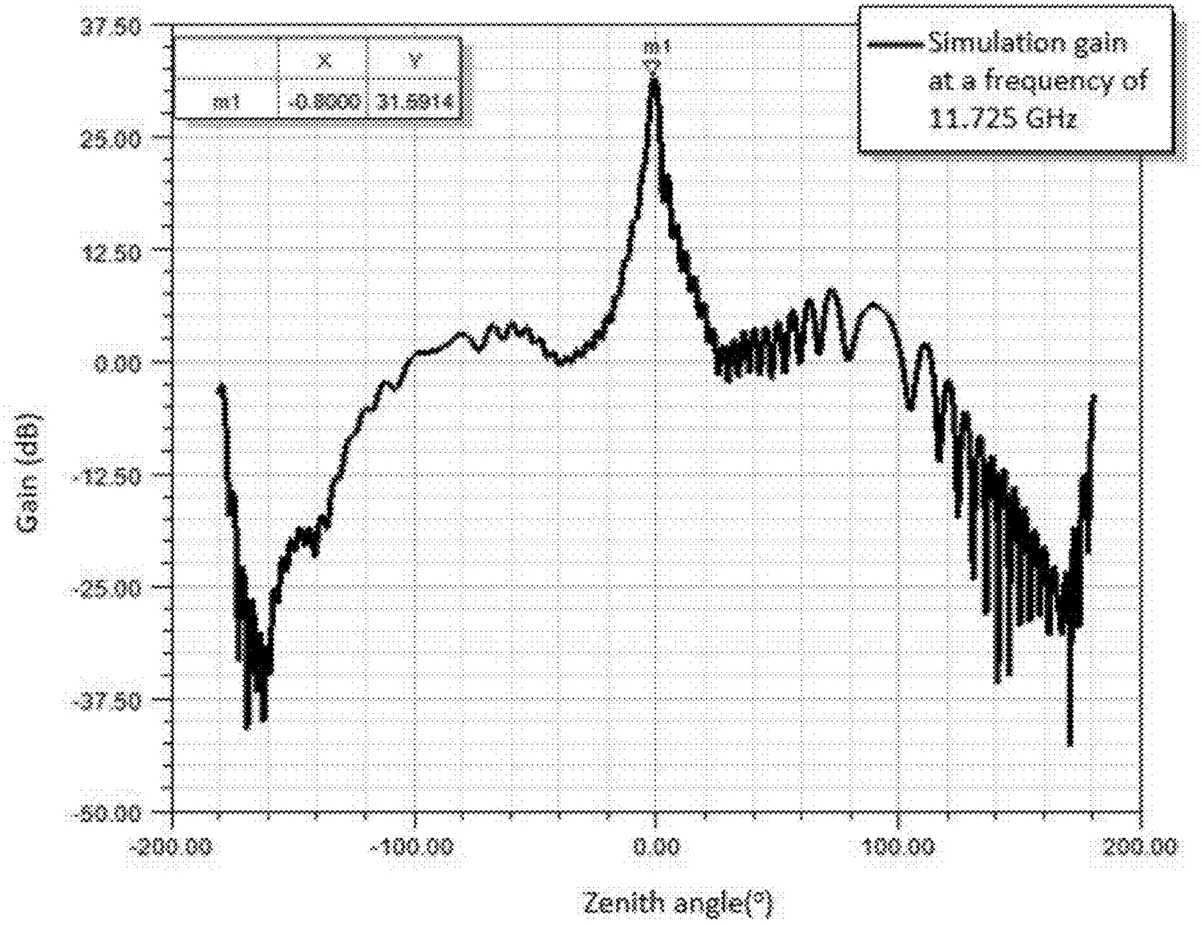
FIGS. 10A and 10B show simulation radiation patterns for embodiments at a 0-degree rotation angle, FIG. 10A displays patterns at the center frequency (11.725 GHZ) of Ku band and FIG. 10B displays patterns at the center frequency (29.25 GHZ) of Ka band.
Figure 10B:
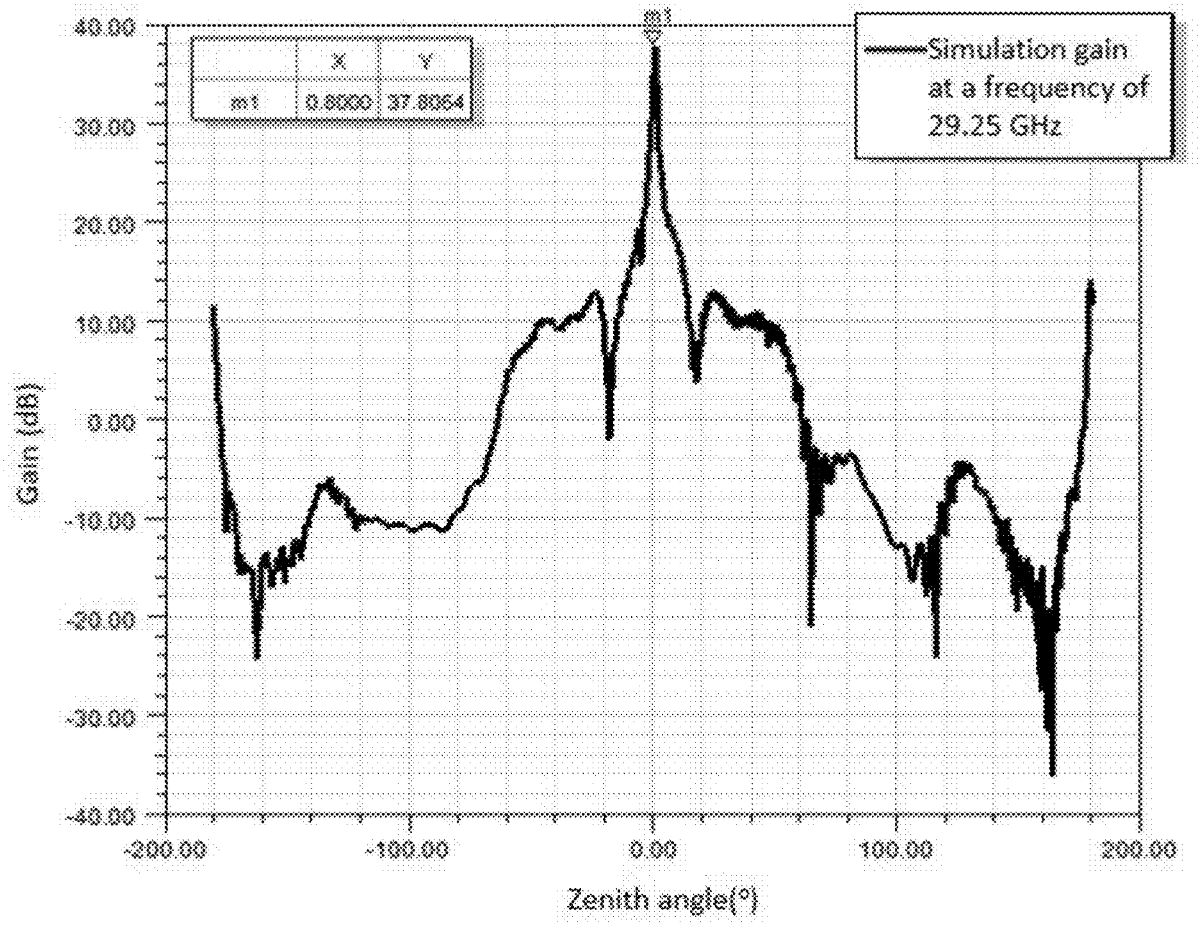
Figure 11A:
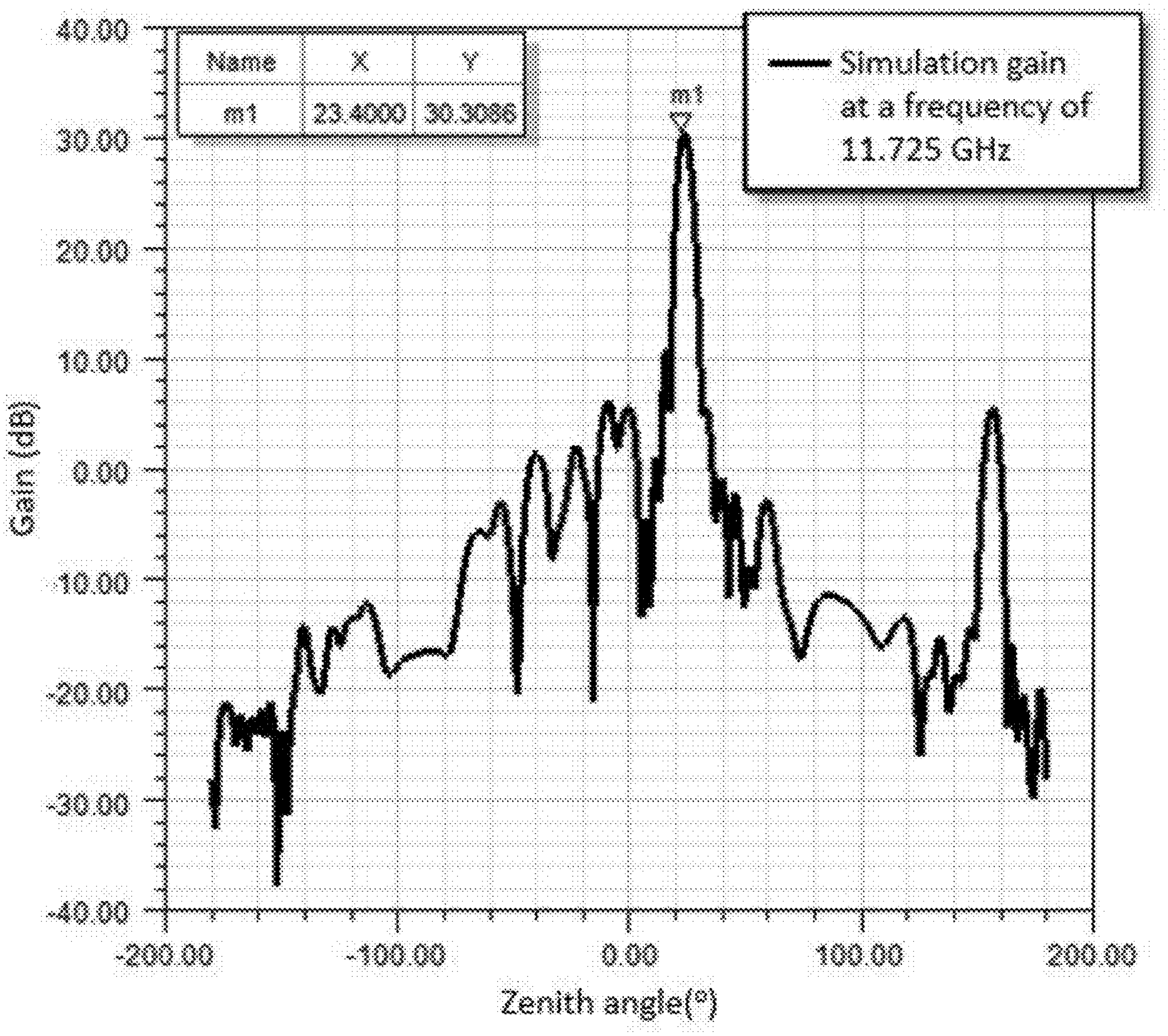
FIGS. 11A and 11B show simulation radiation patterns for embodiments at a 20-degree rotation angle, FIG. 11A displays patterns at the center frequency (11.725 GHz) of Ku frequency band and FIG. 11B displays patterns at the center frequency (29.25 GHZ) of Ka frequency band.
Figure 11B:
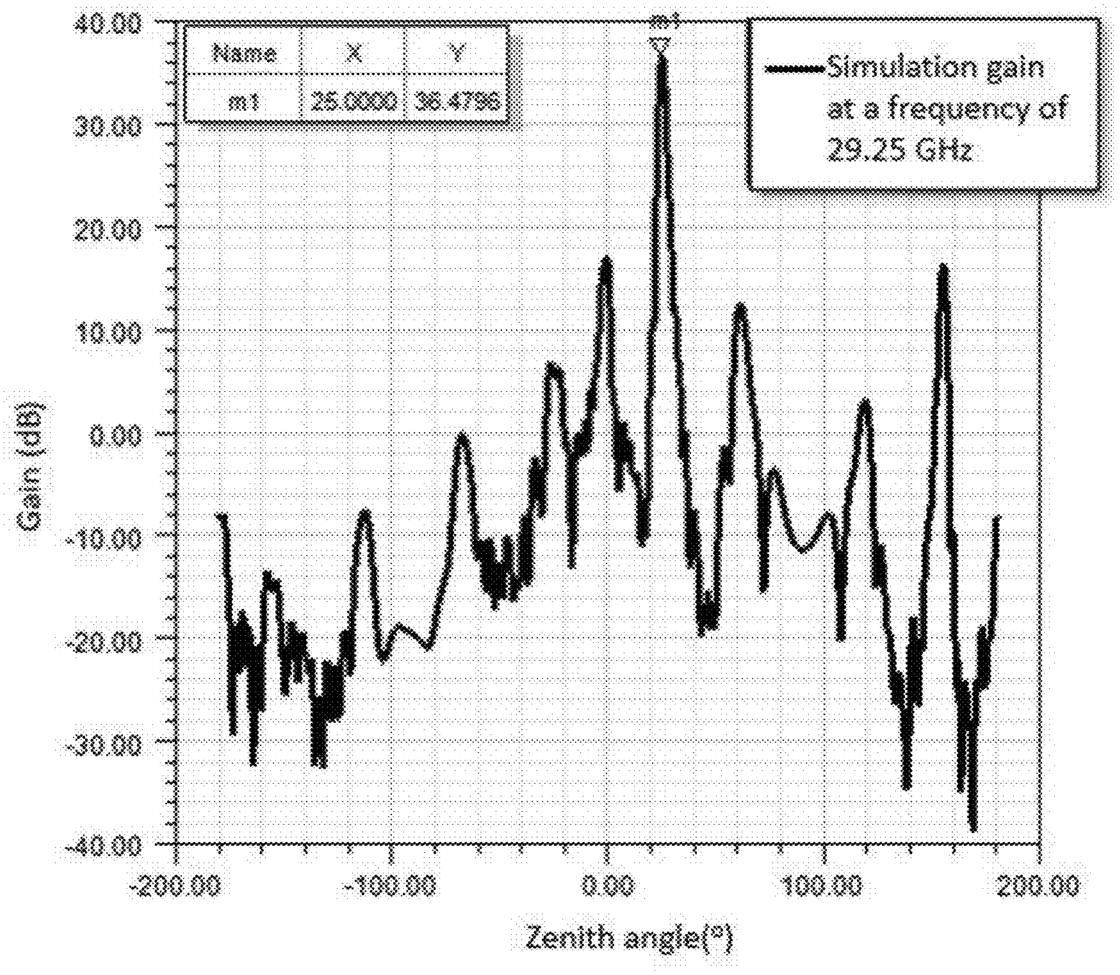

An example design of a dual-band VICTS antenna subsystem in Ku and Ka frequency bands is shown in FIGS. 9A and 9B, while FIGS. 9A and 9B present three-dimensional and side views of this subsystem, respectively. At a rotation angle of 0 degrees, representing the initial position of this antenna subsystem, the simulated radiation patterns for the design example at the Ku and Ka bands have been shown in FIGS. 10A and 10B. Here, with a diameter of the dual-band VICTS antenna subsystem set at 500 mm, FIG. 10A displays the simulated radiation pattern at the center frequency (i.e., 11.725 GHZ) of the Ku frequency band, while FIG. 10B showcases the simulated radiation pattern at the center frequency (i.e., 29.25 GHz) of the Ka frequency band. These results are comparable to those of a single-band VICTS antenna of equivalent size and band. When the rotation angle is increased to 20 degrees, the simulated radiation pattern of this design example for the dual-band VICTS antenna subsystem is shown in FIGS. 11A and 11B, specifically, FIG. 11A shows the simulated radiation pattern at the center frequency (i.e., 11.725 GHz) of the Ku band, while FIG. 11B shows the simulated radiation pattern at the center frequency (i.e., 29.25 GHz) of the Ka frequency band. As compared to the beam radiation direction at the initial position, a notable steering of the beam direction is observed at a 20 degree rotation angle, with performance akin to that of a single-band VICTS antenna of corresponding size and band. Additional simulation results for the design example of the dual-band VICTS antenna subsystem in Ku and Ka frequency bands are summarized in Tables 1 and 2. Table 1 shows the simulation results and the relationship between the rotation angle and antenna gain, as well as the zenith angle at 11.725 GHz in Ku band; while Table 2 shows the results and relationship between the rotation angle and antenna gain, and zenith angle at 29.25 GHz in Ka band. These findings underscore that the performance of the dual-band VICTS antenna subsystem closely resembles that of two single-band VICTS antennas under the corresponding size and band specifications. The dual-band VICTS antenna subsystem represents a pivotal innovation in the switchable dual-band dual-polarized VICTS antenna system, defining the span of two frequency bands of the entire antenna system 12. The example of the present invention has verified that the frequency difference of the two electromagnetic wave bands operating in the switchable dual-band dual-polarized VICTS antenna system may be as large as three times. For instance, this could range from 10 GHz of the Ku band to 30 GHz of the Ka band. As such, the switchable dual-band dual-polarized VICTS antenna system can be effectively utilized in any two bands with a frequency difference of less than three times. However, if the frequency difference between two frequency bands exceeds three times, the signal leakage in the switchable dual-band dual-polarized VICTS antenna system increases significantly at a large rotation angle, thereby impacting antenna communication performance.

TABLE 1

Summary of simulation results for antenna gains and zenith angles at 11.725 GHz in the Ku band for different rotation angles of the dual-band VICTS antenna subsystem with a diameter of 500 mm for Ku and Ka bands.

| Rotation angle (degree) | Zenith angle (degree) | Antenna gain (dB) |
|---|---|---|
| 0 | 1.2 | 31.6 |
| 20 | 23.4 | 30.3 |

TABLE 1-continued

Summary of simulation results for antenna gains and zenith angles at 11.725 GHz in the Ku band for different rotation angles of the dual-band VICTS antenna subsystem with a diameter of 500 mm for Ku and Ka bands.

| Rotation angle (degree) | Zenith angle (degree) | Antenna gain (dB) |
|---|---|---|
| 40 | 52.6 | 27.2 |
| 42 | 56.8 | 27.1 |

TABLE 2

Summary of simulation results for antenna gains and zenith angles at 29.25 GHz in the Ka band for different rotation angles of the dual-band VICTS antenna subsystem with a diameter of 500 mm for Ku and Ka bands.

| Rotation angle (degree) | Zenith angle (degree) | Antenna gain (dB) |
|---|---|---|
| 0 | 0.8 | 37.8 |
| 20 | 25 | 36.5 |
| 40 | 56 | 28.5 |
| 42 | 61.2 | 27.1 |

Dual-Band Dual-Polarized Polarization Subsystem.

The dual-band VICTS antenna subsystem generates two independent linearly polarized electromagnetic beams when no additional polarizer is added. To fulfill the polarization requirements for satellite communications, a dual-band dual-polarized polarization subsystem has been developed. The dual-band dual-polarized polarization subsystem can operate in two separate frequency bands and support various combinations of polarizations in the two bands, including two linear polarizations, two circular polarizations, or one linear polarization and one circular polarization. The dual-band dual-polarized polarization subsystem has been developed as a multi-layered structure, seamlessly integrating into the overall multi-layered configuration of the switchable dual-band dual-polarized VICTS antenna system. Based on the polarization needs of wave beams in both frequency bands, the dual-band dual-polarized polarization subsystem provides corresponding layered polarizer designs.

Figure 12:
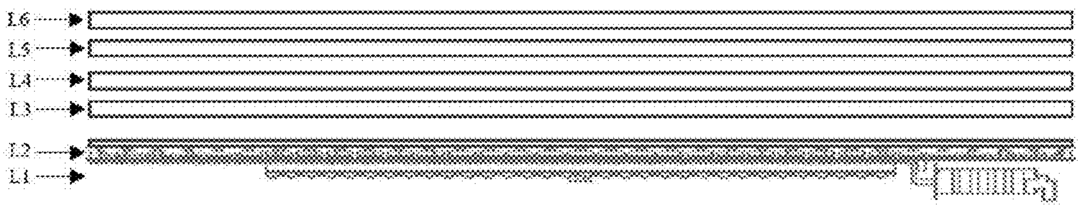
FIG. 12 provides a side view of the present invention when beams of two bands are linearly polarized.

First, if the beams of the two frequency bands are linearly polarized, the dual-band dual-polarized polarization subsystem will employ only linear polarizer(s) 201. When the two operating bands are far apart, the dual-band dual-polarized polarization subsystem will consist of two linear polarizers 201 operating in the two bands. Each polarizer is formed by two linear polarization plates operating in the respective band to rotate the direction of the E-vector of the beam, as shown in FIG. 12. In FIG. 12, layers L1 and L2 constitute a dual-band VICTS antenna subsystem; layers L3 and L4 represent two linear polarization plates of one linear polarizer 201, capable of rotating the direction of the E-vector of a beam within one band to reduce communication loss with a satellite; and layers L5 and L6 represent two linear polarization plates of the other linear polarizer 201, enabling rotation of the direction of the E-vector of the beam within the other band. Conversely, when two operating bands are sufficiently close and can be covered by one broadband linear polarizer, the dual-band dual-polarized polarization subsystem can be simplified into a broadband linear polarizer subsystem. In this scenario, layers L5 and L6 in FIG. 12 are omitted, requiring only layers L3 and L4 to form a broadband polarizer subsystem covering the operation of two bands.

Figure 13:
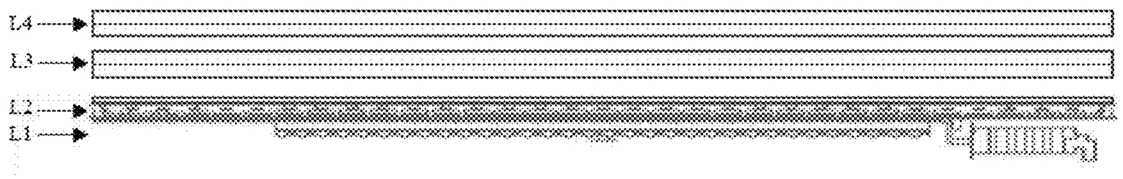
FIG. 13 offers a side view of the present invention when beams of two bands are circularly polarized.

Secondly, when the beams of the two bands are circularly polarized, the dual-band dual-polarized polarization subsystem contains only circular polarizers. When the two operating bands are far apart, the dual-band dual-polarized polarization subsystem is formed by two circular polarizers 202 operating in the two bands, each of which may be designed as a layer of circular polarization plate, as shown in FIG. 13. In FIG. 13, layers L1 and L2 constitute a dual-band VICTS antenna subsystem; layers L3 and L4 represent two circular polarizers 202, capable of converting the linear polarization of beams into circular polarization in their respective bands to meet the requirement of satellite mobile communication; when the two operating bands are close enough, the dual-band dual-polarized polarization subsystem can be further simplified to a broadband circular polarizer as layer L3, with layer L4 in FIG. 13 removed.

Figure 15:
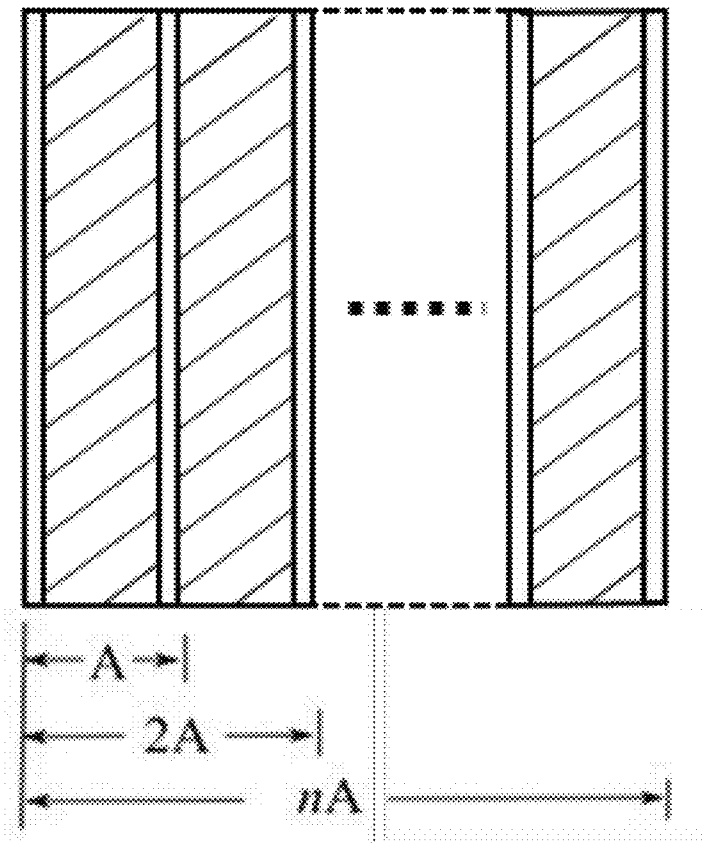
FIG. 15 showcases a multi-layer antenna radome of an ultra-wideband, featuring a recommended dual-band or broadband sandwich structure.

Finally, when the beam in one of two bands is linearly polarized and the other is circularly polarized, the dual-band dual-polarized polarization subsystem is designed with one linear polarizer 201 and one circular polarizer 202, each operating in their respective bands, as shown in FIG. 15. In FIG. 15, layers L1 and L2 constitute the dual-band VICTS antenna subsystems; layers L3 and L4 represent two linear polarization plates of one linear polarizer 201, capable of rotating the direction of the E-vector of the beam in one frequency band; and layer L5 represents a circular polarizer, operating in the other band to convert linear polarization into circular polarization.

Figure 14:
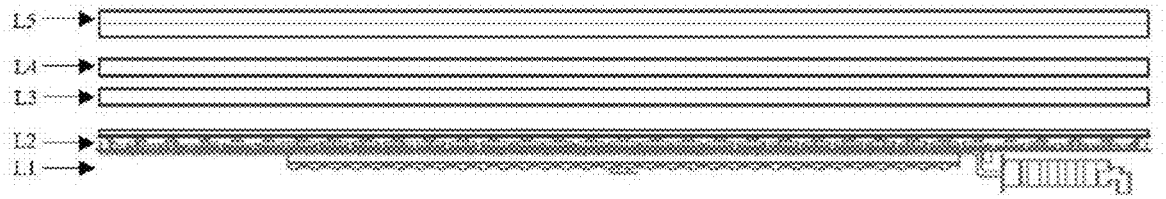
FIG. 14 showcases a side view of the present invention when one of the beams of two bands is circularly polarized and the other is linearly polarized.

A switchable dual-band dual-polarized polarization subsystem has been designed to fulfill the polarization requirements of the antenna system 12 for Ka and Ku bands, as exemplified in the design. In satellite communications, signals at Ku band are linearly polarized, while those at Ka band are circularly polarized. The dual-band dual-polarized polarization subsystem comprises one linear polarizer 201 operating at Ku band and one circular polarizer 202 operating at Ka band, as shown in FIG. 14.

The dual-band dual-polarized polarization subsystem and the dual-band VICTS antenna subsystem, operating in Ka and Ku bands, implement the transmission and reception of the satellite communication in Ka and Ku bands. Skilled professionals can design suitable linear polarizers 201 and circular polarizers 202 based on specific requirements, utilizing the established and well-established technology in the field. As an example, a meander-line circular polarizer has been proposed and designed for use in Ka/Ku band. The circular polarizer comprises three metal meander-line layers, in which metal meander-lines are etched onto a dielectric material with proper thickness using mature printed circuit board technology. These layers are bonded together, forming layer L5 in FIGS. 4 and 14, with the circular polarization plate (layer L5) being rotated by motor 1. Additionally, a metal wire grid linear polarizer has been employed and optimized for Ka/Ku band. The linear polarizer 201 comprises two separate layers, L3 and L4, as shown in FIGS. 4 and 14, each driven by respective motors to rotate independently. When operating in the linearly polarized Ku band, the two polarization plates (L3 and L4) of the linear polarizer 201 are rotated by the motors 1 to rotate the direction of the E-vector of the received or transmitted electromagnetic beam, thereby achieving communication with the satellite. Meanwhile, the circular polarization plate (L5) is positioned at another specific angle to enable the linearly polarized electromagnetic wave to pass through with minimal impact on insertion loss. Conversely, when operating in the circularly polarized Ka band, the circular polarization plate is rotated to a specific angle position to convert the linearly polarized wave into left-hand or right-hand circularly polarized waves. Meanwhile, the two polarization plates (L3 and L4) of the linear polarizer 201 are disposed at specific angle positions to allow the electromagnetic beam to pass through them with minimal impact on insertion loss.

To verify the dual-band dual-polarized polarization subsystem, a dual-band dual-polarized polarization subsystem has been designed and optimized for Ka and Ku bands with a VICTS antenna subsystem in a diameter of 100 mm. Due to the limitation of computing power and storage, a single-band VICTS antenna subsystem has been used in the simulation model, which did not affect the performance assessment of the dual-band dual-polarized polarization subsystem.

Table 3 shows the simulation gains at different frequencies of the single-band VICTS antenna subsystem with and without the dual-band dual-polarized polarization subsystem at the Ka-band with circularly polarized waves, while the VICTS antenna subsystem is in the initial position, and the L2 and L3 linear polarization plates are set at specific positions to allow the electromagnetic waves to pass through. Meanwhile, the circular polarizer (L5) is set at a specific angular position to convert linear polarized waves into circularly polarized waves. Table 4 shows the simulation gains at different frequencies of the single-band VICTS antenna subsystem without/with the dual-band dual-polarized polarization subsystem at the Ku-band with linearly polarized waves, where the antenna system 12 is also in the initial position, and the circular polarizer (L5) is set at another specific angular position to allow the linearly polarized electromagnetic waves to pass through without changing the polarization mode thereof. The linear polarization plates (L2 and L3) are rotated by the motors 1 to rotate the direction of the E-vector of the received or transmitted electromagnetic beam. The insertion loss caused by the dual-band dual-polarized polarizer subsystem is less than 0.4 dB for both Ka and Ku bands, as shown in Tables 3 and 4.

TABLE 3

Comparison of simulation gains of the single-band VICTS antenna with/without the dual-band dual-polarized polarization subsystem at Ka band for the initial position with a diameter of 100 mm.

| | Frequency | | |
|---|---|---|---|
| | 27.5 GHz | 29.25 GHz | 31 GHz |
| Gain of single band VICTS only (dB) | 24.4 | 25.2 | 25.2 |
| Gain of VICTS with linear and circular polarization plates (dB) | 25.2 | 24.9 | 25.6 |

TABLE 4

Comparison of simulation gain of the single-band VICTS antenna with/without the dual-band dual-polarized polarization subsystem at Ku band for the initial position with a diameter of 100 mm.

| | Frequency | | |
|---|---|---|---|
| | 10.7 GHz | 11.725 GHz | 12.75 GHz |
| Gain of single band VICTS only (dB) | 16.4 | 16.5 | 17.4 |
| Gain of VICTS with linear and circular polarization plates (dB) | 16.4 | 15.9 | 17.3 |

Dual-Band Rotary Joint.

The switchable dual-band dual-polarized VICTS antenna system facilitates operation in two independent bands and seamless switching between them. To enable this functionality, a dual-band rotary joint 15 has been introduced into this system, as illustrated in FIG. 1. Any skilled professional can select existing commercial dual-band rotary joints 15 to support various combinations of TX/TX, RX/RX, and TX/RX as required.

Dual-Band/Ultra-Broadband Multi-Layer Antenna Radome

Like other on-the-move antennas, the switchable dual-band dual-polarized VICTS antenna system requires an antenna radome when operating outdoors to shield it from environmental factors. The antenna radome must have an ultra-broadband capacity to accommodate the wide bandwidths of dual-band or the dual-band with dual-polarization, ensuring that the performance of the antenna system is not compromised in either band. Skilled professionals can select an existing design for broadband dual-polarization or dual-band dual-polarization antenna radomes suitable for use in the switchable dual-band dual-polarized VICTS antenna system. As a design example, an ultra-broadband multi-layer antenna radome has been proposed and designed for the switchable dual-band dual-polarized VICTS antenna system operating at the Ka and Ku bands. The proposed antenna radome features a multi-A-type sandwich structure, as shown in FIG. 15, specifically designed for Ka and Ku bands. To facilitate simulation, a single-band VICTS antenna subsystem has been utilized in the antenna radome design model, without compromising the performance of the antenna radome and its verification. Simulation results of the above-mentioned single-band VICTS antenna subsystem and dual-band dual-polarized polarization subsystem without/with the proposed antenna radome have been summarized in Tables 5 and 6 for Ku and Ka bands, respectively. The model used for these simulations has a diameter of 100 mm. Notably, the simulation results have demonstrated that the antenna radome has minimal impact on the gain of the switchable dual-band dual-polarized VICTS antenna system, with an additional insertion loss of less than 0.1 dB observed at both Ku and Ka bands,

TABLE 5

Comparison of simulation gains of the single-band VICTS antenna subsystem and the dual-band dual-polarized polarization subsystem with/without the antenna radome at the initial position with the diameter of 100 mm for Ku band.

| | Frequency | | |
|---|---|---|---|
| | 10.7 (GHz) | 11.725 (GHz) | 12.75 (GHz) |
| Gain of VICTS with linear and circular polarization plates (dB) | 16.4 | 16 | 17.1 |
| Gain of VICTS with linear and circular polarization plates and antenna radome (dB) | 16.34 | 16.1 | 17 |
| Difference of gains (dB) | −0.06 | 0.1 | −0.1 |

TABLE 6

Comparison of simulation gains of the single-band VICTS antenna subsystem and the dual-band dual-polarized polarization subsystem with/without the antenna radome at the initial position with the diameter of 100 mm for Ka band.

| | Frequency | | |
|---|---|---|---|
| | 27.5 (GHz) | 29.25 (GHz) | 31 (GHz) |
| Gain of VICTS with linear and circular polarization plates (dB) | 26.1 | 24.7 | 26.6 |
| Gain of VICTS with linear and circular polarization plates and antenna radome (dB) | 26.1 | 25 | 26.9 |
| Difference of gains (dB) | 0 | 0.3 | 0.3 |

Figure 16:
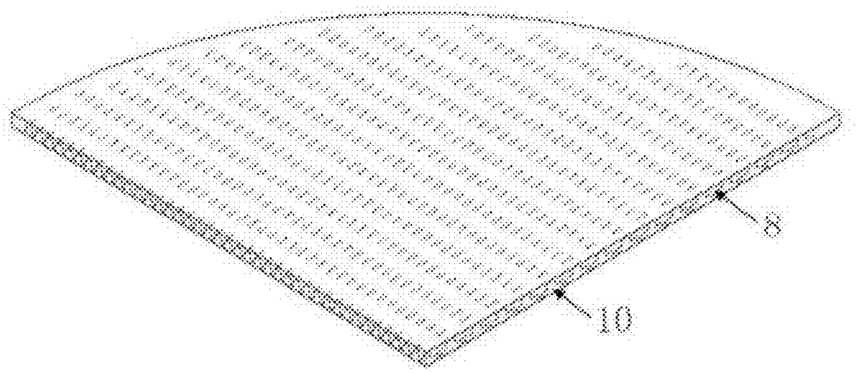
FIG. 16 presents a three-dimensional view of a quarter of a dual-band VICTS electromagnetic radiator according to the present invention.

One of the major features of the switchable dual-band dual-polarized VICTS antenna system is its suitability for multi-layer processing, which aligns with the principles of design for manufacturing and assembly (DFMA). The entire system has been designed as a multi-layer structure, allowing each layer thereof to be manufactured separately. Specifically, the dual-band VICTS antenna subsystem comprises two layers, denoted as L1 and L2, as depicted in FIGS. 4, 9A and 9B. Layer L2, constituting the dual-band VICTS radiator, is designed as a two-dimensional array of metal blocks with foam filling the gaps and reinforced with a dielectric material plate. To minimize weight, all metal blocks can be substituted with lightweight surface-metallized plastic blocks. FIG. 16 shows a three-dimensional view of a portion of the L2 layer, illustrating an array of metal blocks within the filled foam. Subsequently, this layer is assembled with a first supporting structure 11 that is rotatable using motor 1, as illustrated in FIG. 17. Each layer is driven by a respective motor 1 to facilitate rotation, enabling beam control for real-time satellite mobile communication within the switchable dual-band dual-polarized VICTS antenna system.

Figure 18A:
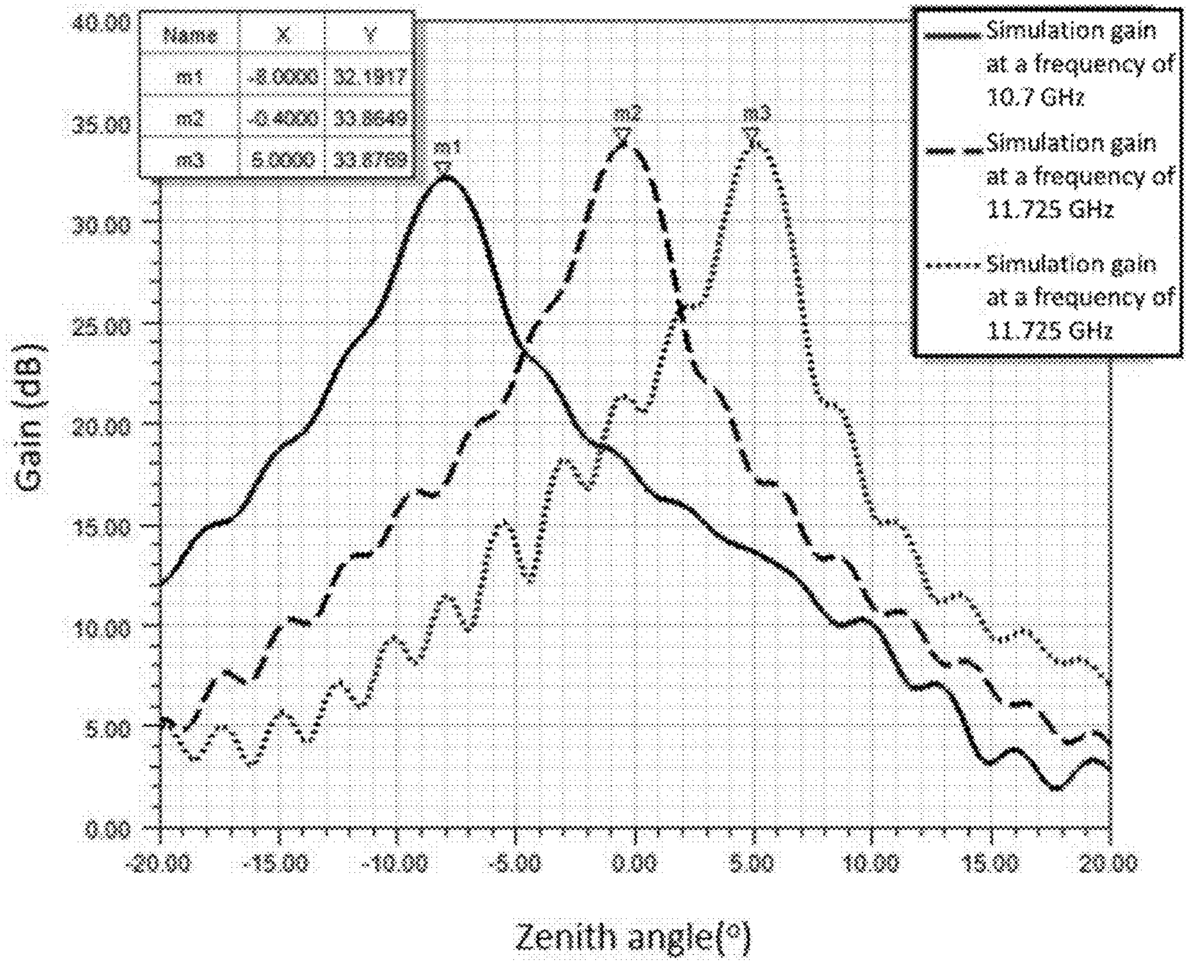
FIGS. 18A and 18B show simulation results for a design embodiment of a dual-band VICTS subsystem without a polarizer subsystem.
Figure 18B:
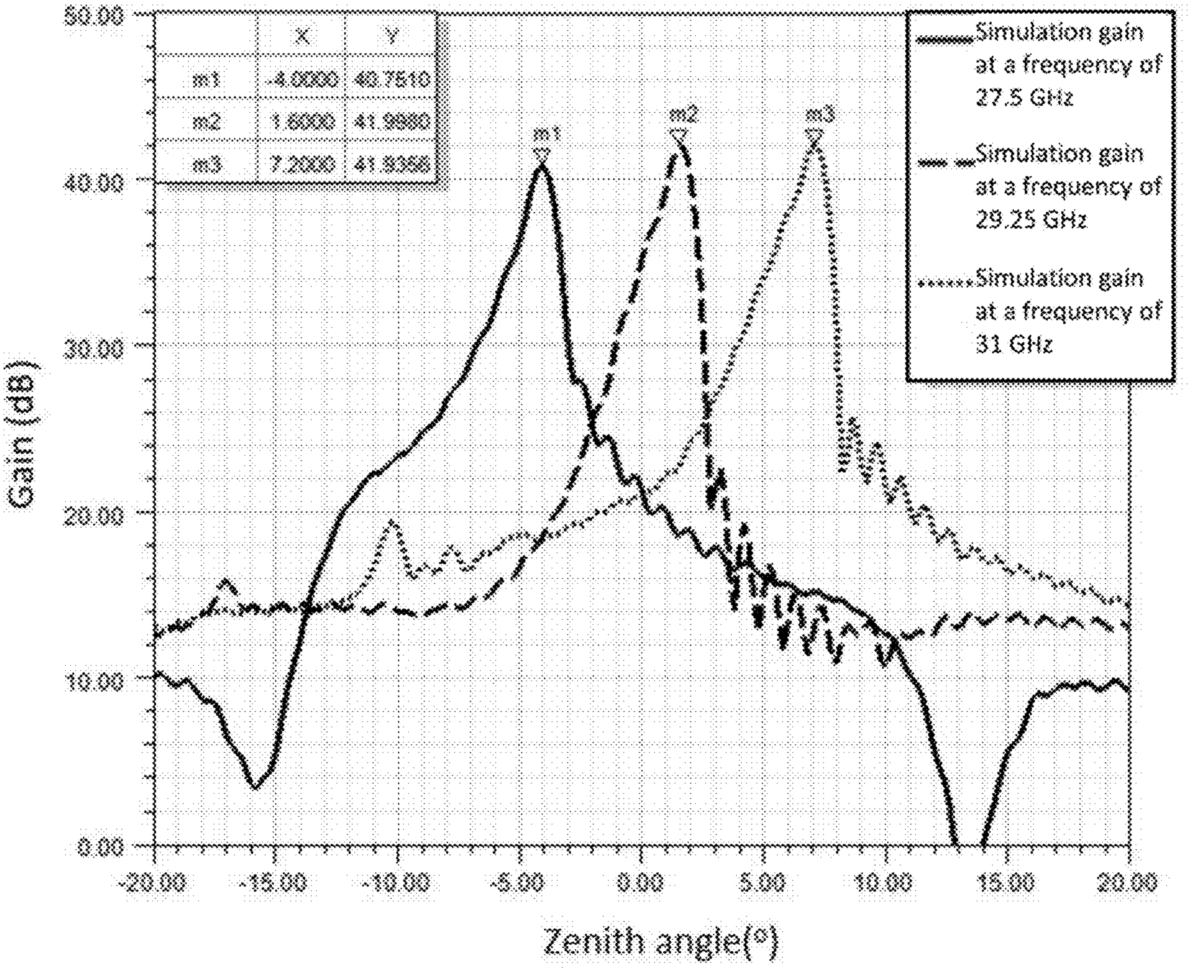
Figure 19A:
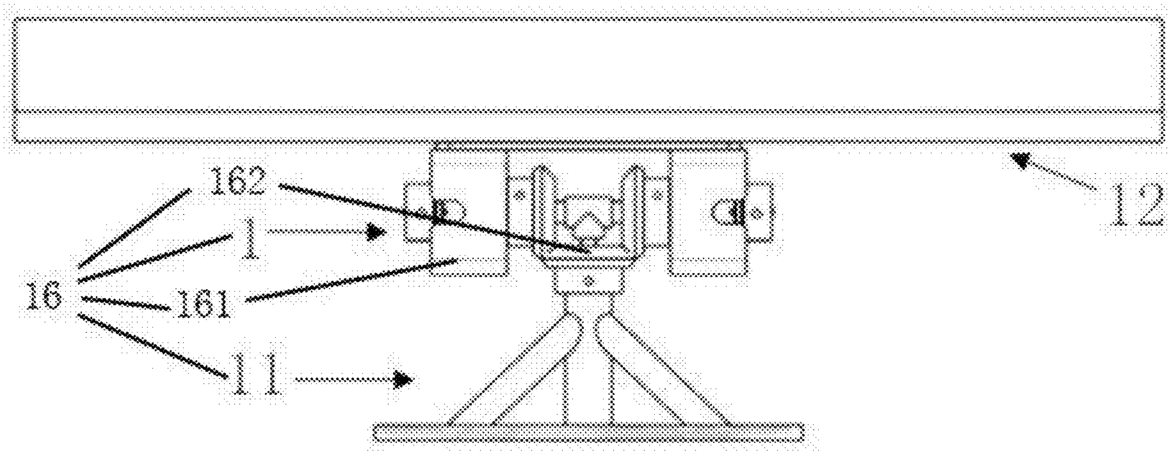
FIGS. 19A and 19B show a separated motorized rotation stage at the bottom of the present invention.
Figure 19B:
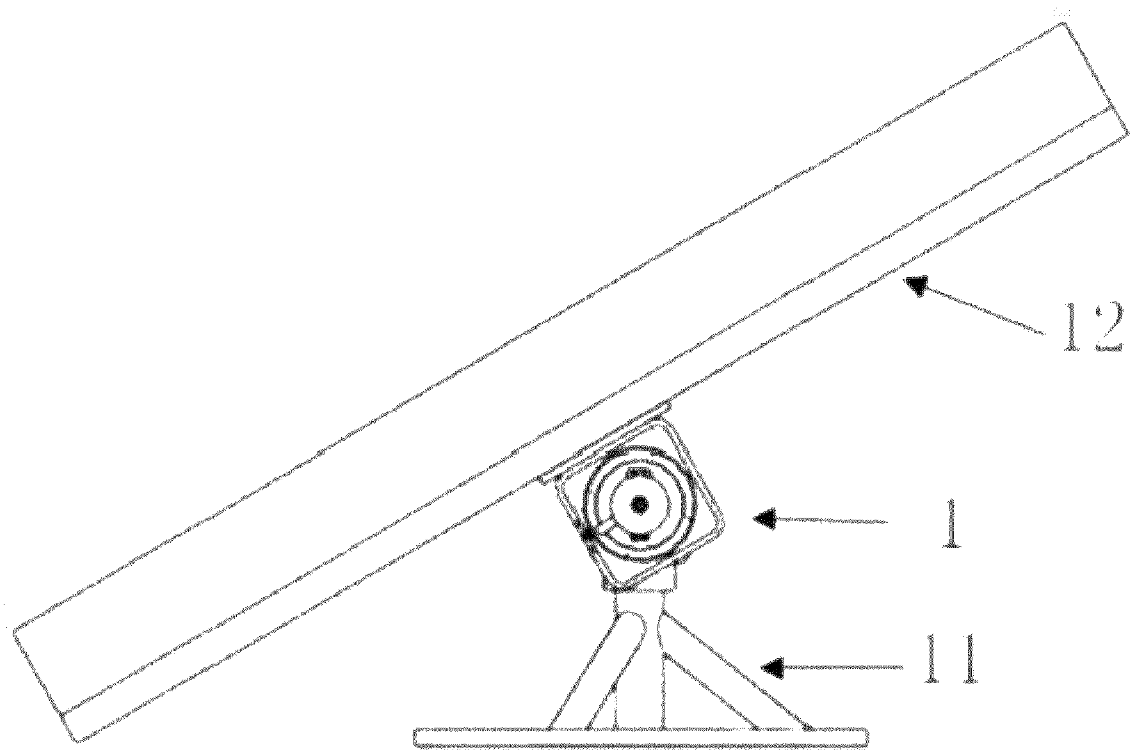
Figure 20:
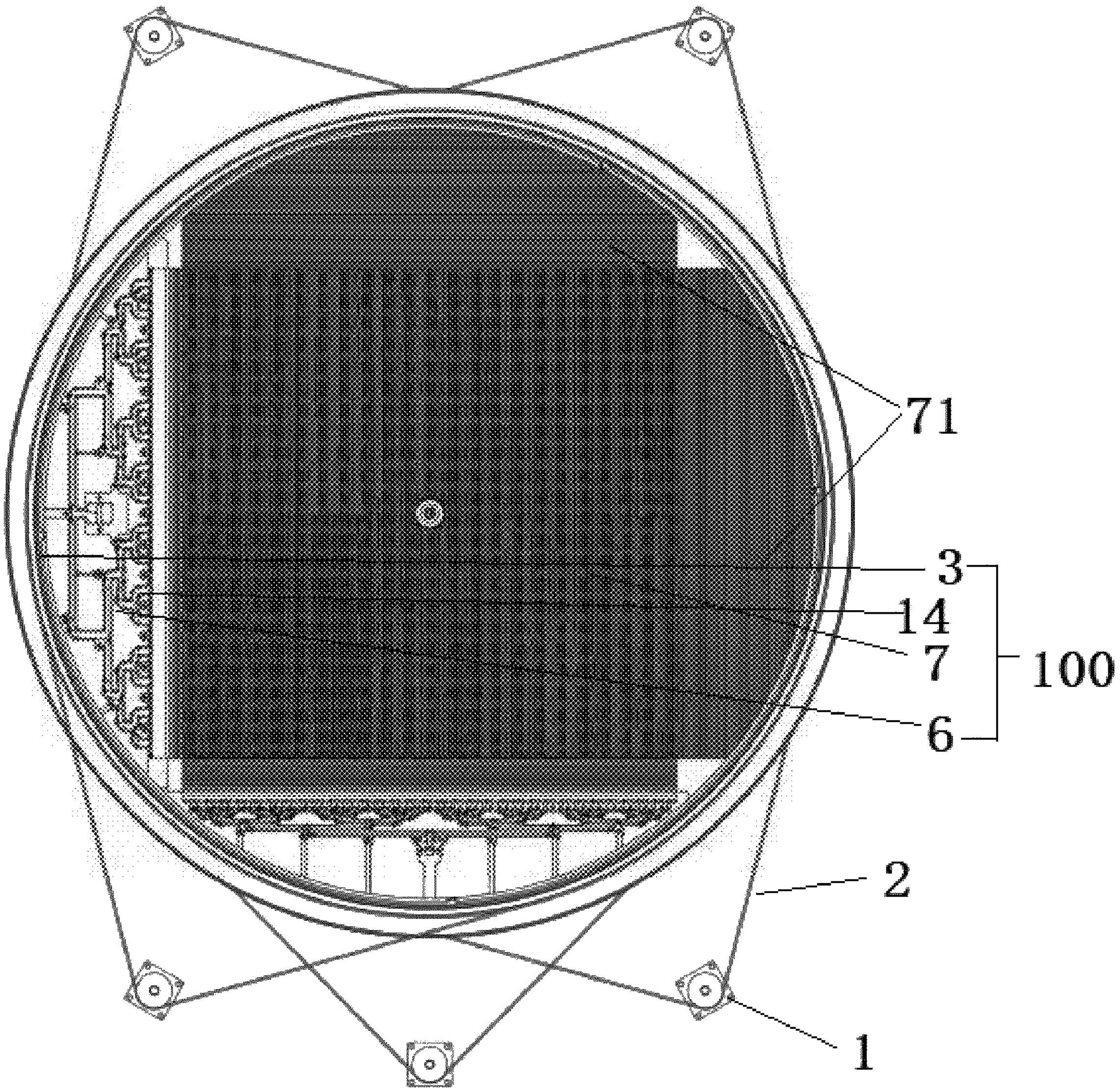
FIG. 20 is a top view of FIG. 19.
Figure 21:
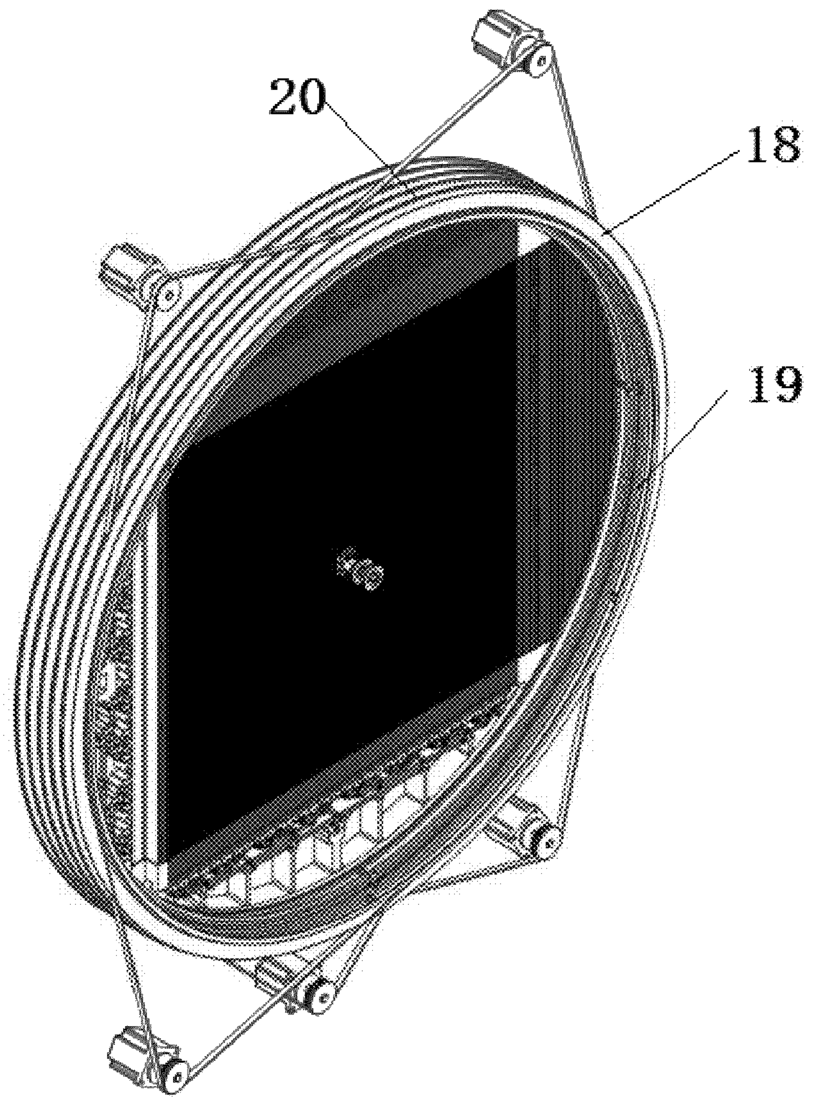
FIG. 21 is a side view of FIG. 20.
Figure 22:
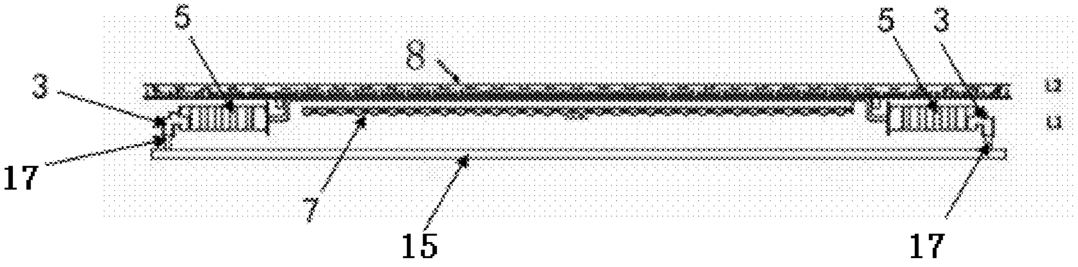
FIG. 22 is a side view of dual band VICTS antenna subsystem in Ka and Ku frequency bands.
Figure 23:
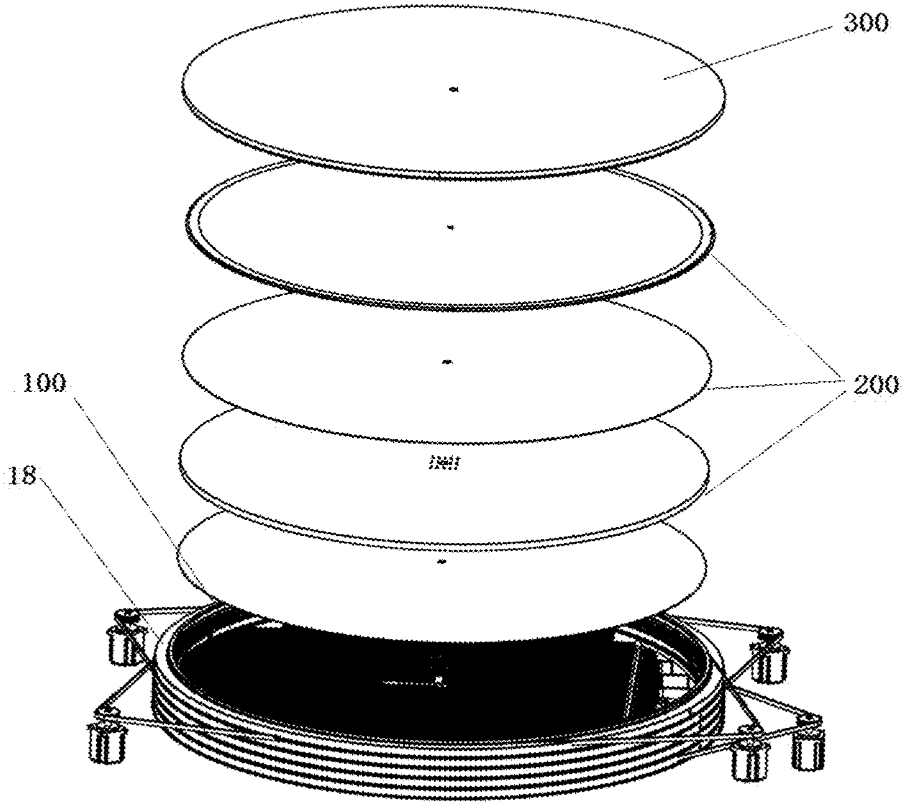
FIG. 23 is an explosion diagram of a housing and each layer structure in a z-axis direction.

In the switchable dual-band dual-polarized VICTS antenna system, the scanning coverage ranges differ for various frequencies within the two bands. As depicted in FIGS. 18A and 18B, simulation gains are plotted against zenith angles for a design example of the switchable dual-band dual-polarized VICTS antenna system at Ku and Ka bands, respectively. The results indicate that only an electromagnetic beam of one frequency within the whole band can pass through the zenith. Specifically, in the design examples, only the electromagnetic beams at the center frequency (i.e., 11.725 GHZ) of Ku band and the center frequency (i.e., 29.25 GHZ) of Ka band pass through the zenith. To address this limitation and extend the scanning coverage range, an independent motorized rotation stage 16 has been innovatively introduced and positioned at the base of the switchable dual-band dual-polarized VICTS antenna system. This rotation stage 16 supports an ultra-wide zenith angle scanning coverage range, enabling wave beams from both frequency bands to pass through the zenith. For stable operation, this motorized rotation stage 16 has been designed with a dual-motor module, mainly consisting of two motors 1, two reducers 161, three bevel gears 162, and a first supporting structure 11. It is integrated with the switchable dual-band dual-polarized VICTS antenna system, as shown in FIGS. 19A and 19B. FIG. 19A shows the side view of a switchable dual-band dual-polarized VICTS antenna system with the motorized rotation stage 16 in a horizontal initial position, while FIG. 19B displays the side view of the motorized rotation stage 16 when rotated by 10 degrees. When the two motors within the motorized rotation stage rotate at the same speed and in the same direction, the switchable dual-band dual-polarized VICTS antenna system, mounted on the motorized rotation stage 16, undergoes a pitching motion. Conversely, when the two motors counter-rotate at the same speed, the switchable dual-band dual-polarized VICTS antenna system mounted on the motorized rotation stages is capable of horizontal rotation movement.

This design overcomes the disadvantage that the VICTS antenna cannot scan across the zenith angle for the whole frequency band. It enables the switchable dual-band dual-polarized VICTS antenna system to support full-frequency-band zenith angle scanning, expanding the scanning range of the system to an ultra-wide zenith angle scanning range in two bands. For example, simulation results of design examples in Ka and Ku bands show that the zenith angle scanning range of the switchable dual-band dual-polarized VICTS antenna system extends to 0 to +90 degrees at the Ku band and extends to 0 to +65 degrees at Ka band.

Switchable Dual-Band Dual-Polarized VICTS Antenna System

The present invention, the switchable dual-band dual-polarized VICTS antenna system, achieves a significant reduction in size, weight, and cost compared to operating two single-band VICTS systems independently in two frequency bands. Moreover, the feasibility of mass production and further weight reduction through plastic and plastic electroplating processes enhances its cost-effectiveness. After optimization, the present invention implements similar antenna performance to existing two single-band VICTS antenna systems while offering several advantages including low cross-coupling, absence of grating lobe and blind area, large scanning range, and high efficiency. Compared to conventional active electronically scanned array (AESA) systems, the present invention has lower power consumption, eliminates the need for a cooling system, contains fewer components, offers a longer mean time between failure (MTBF), and exhibits higher reliability. Its vertically integrated manufacturing is easier to implement because fewer components and fewer suppliers are required. The present invention offers significant advantages in millimeter wave bands such as Ku, Ka, Q, V, E, and W bands. It finds broad applications in satellite mobile communication markets, including multi-beam systems, gateway systems, mobile terminals, and space payload systems of LEO/MEO user terminals. Overall, the present invention substantially reduces the cost, volume, and weight of the entire system, making it a highly desirable solution for diverse satellite communication applications.

According to the switchable dual-band dual-polarized VICTS antenna system for satellite communication on-the-move disclosed by the present invention, arranging the antenna system 12 in a layered manner has led to improved gains and bandwidths, effective separation of frequency bands, and reduced size and cost. In addition, the switchable dual-band dual-polarized VICTS antenna system is controlled by a separately disposed motorized rotation stage, enabling scanning of the antenna system 12 across the zenith in two frequency bands.

Of course, those skilled in the art should be able to make various changes and modifications to the present invention without departing from the spirit and scope of the present invention, and such changes and modifications should be included in the protection scope of the claims of the present invention.

What is claimed is:

1. A switchable dual-band dual-polarized variable inclination continuous transverse stub, (VICTS) antenna system for satellite communication on-the-move, wherein the VICTS antenna system is a layered structure, that comprises:

a dual-band VICTS antenna subsystem, a dual-band dual-polarized polarization subsystem, a dual-band/ultra-broadband layered antenna radome, and a mechanical subsystem configured to control the switchable dual-band dual-polarized VICTS antenna system, wherein the mechanical subsystem is connected to the dual-band VICTS antenna subsystem and the dual-band dual-polarized polarization subsystem through motorized connection, including motors and belts, the dual-band VICTS antenna subsystem is the layered structure comprising two layers, one layer is a dual-band feed network, comprising a dual-band slow-wave structure and two transitions from rectangular waveguides to the dual-band slow-wave structure, the two transitions connect the rectangular waveguides as input/output to the dual-band slow-wave structure, the dual-band slow-wave structure is a two-dimensional groove grid structure, formed by orthogonally interweaving two single-band slow-wave structures of two bands, another layer is a dual-band VICTS electromagnetic radiator, created by orthogonally integrating two single-band VICTS electromagnetic radiators, while long sides of slots of the two single-band VICTS electromagnetic radiators are perpendicular to each other, forming a two-dimensional matrix structure of metal blocks through interweaving;

the dual-band dual-polarized polarization subsystem comprises two linear polarizers and one circular polarizers;

when the linear polarizer is activated, an orientation of an E-vector of an electromagnetic beam is rotated;

when the circular polarizer works, a linearly polarized wave is converted into either a left-handed or a right-handed circularly polarized wave;

the VICTS antenna system further includes air gaps between layers within the layered structure;

the mechanical subsystem, comprising the motors and the belts, interfaces with both the dual-band VICTS antenna subsystem and the dual-band dual-polarized polarization subsystem to facilitate their operation;

furthermore, the layered structure further comprises a supporting structure connected to the mechanical subsystem via an adapter mechanism.

2. The switchable dual-band dual-polarized VICTS antenna system for satellite communication on-the-move according to claim 1, wherein the transitions from the rectangular waveguides to the dual-band slow-wave structure comprise the rectangular waveguide as input/output, a twisted waveguide, a power divider, and a group of adapters connected to a parallel plate waveguide; and the power divider in the transitions is positioned in either the H-plane or E-plane of the rectangular waveguides.

3. The switchable dual-band dual-polarized VICTS antenna system for satellite communication on-the-move according to claim 1, wherein the dual-band slow-wave feed network is created by integrating the two single-band slow-wave structures, where grooves of the two single-band slow-wave structures are orthogonally disposed.

4. The switchable dual-band dual-polarized VICTS antenna system for satellite communication on-the-move according to claim 2, wherein the mechanical subsystem further comprises the belts and the supporting structure, wherein each of the motors controls each layer of the layered structure, and is connected to the dual-band VICTS antenna subsystem, the dual-band dual-polarized polarization subsystem, and the antenna radome through the adapter mechanism.

5. The switchable dual-band dual-polarized VICTS antenna system for satellite communication on-the-move according to claim 1, wherein both the dual-frequency VICTS antenna subsystem and the dual-frequency dual-polarized polarization subsystem are formed by a layered dielectric material, and the metal block is metalized with light plastic materials.

6. The switchable dual-band dual-polarized VICTS antenna system for satellite communication on-the-move according to claim 5, wherein the antenna system further comprises a dual-band rotary joint having two input/output ports.

7. The switchable dual-band dual-polarized VICTS antenna system for satellite communication on-the-move according to claim 6, wherein the layered structure comprises six independent layers, and the six layers from a bottom are sequentially as follows:

layer 1 L1 comprises the dual-band slow-wave structure and the two transitions from the rectangular waveguides to the dual-band slow-wave structure;

layer 2 L2 is the dual-band VICTS electromagnetic radiator;

layer 3 L3 and layer 4 L4 are two independent plate layers of the linear polarizer;

layer 5 L5 is the circular polarizer; layer 6 L6 is the dual-band/ultra-broadband layered antenna radome, which is fixedly disposed on a housing; and each of the layers L1, L2, L3, L4, and L5 is connected to one of the motors.

8. The switchable dual-band dual-polarized VICTS antenna system for satellite communication on-the-move according to claim 7, wherein the air gaps are gaps between six layers of the switchable dual-band dual-polarized VICTS antenna system, with the gaps labeled sequentially from a bottom as G0, G1, G2, G3, and G4;

G0 is an interlayered air gap between the dual-band slow-wave structure and the dual-band VICTS electromagnetic radiator in the dual-band VICTS antenna subsystem;

G1 is an interlayered air gap between the dual-band VICTS antenna subsystem and the dual-band dual-polarized polarization subsystem;

G2 is an interlayered air gap between two plate layers of the linear polarizer in the dual-band dual-polarized polarization subsystem;

G3 is an interlayered air gap between the linear polarizer and the circular polarizer in the dual-band dual-polarized polarization subsystem; and G4 is an interlayered air gap between the dual-band dual-polarized polarization subsystem and the dual-band antenna radome.

9. The switchable dual-band dual-polarized VICTS antenna system for satellite communication on-the-move according to claim 7, wherein a bottom of the switchable dual-band dual-polarized VICTS antenna system is also provided with a motor module, and the motor module comprises two of the motors, two speed reducers, three bevel gears, and the supporting structure, all mechanically connected, and further connected to the switchable dual-band dual-polarized VICTS antenna system via the adapter mechanism.

* * * * *